US012526481B2

(12) United States Patent
Jia et al.

(10) Patent No.: US 12,526,481 B2
(45) Date of Patent: Jan. 13, 2026

(54) METHOD AND RELATED ELECTRONIC DEVICE FOR DISPLAYING A VIDEO AND ASSOCIATED PICTURES

(71) Applicant: Honor Device Co., Ltd., Shenzhen (CN)

(72) Inventors: Guiqing Jia, Shenzhen (CN); Jianing He, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/277,134

(22) PCT Filed: Dec. 29, 2022

(86) PCT No.: PCT/CN2022/143658
§ 371 (c)(1),
(2) Date: Aug. 14, 2023

(87) PCT Pub. No.: WO2023/160238
PCT Pub. Date: Aug. 31, 2023

(65) Prior Publication Data
US 2025/0016417 A1    Jan. 9, 2025

(30) Foreign Application Priority Data
Feb. 28, 2022   (CN) .......................... 202210188529.5

(51) Int. Cl.
*H04N 21/472*     (2011.01)
*H04N 21/431*     (2011.01)
*H04N 21/4722*    (2011.01)

(52) U.S. Cl.
CPC ... *H04N 21/47217* (2013.01); *H04N 21/4316* (2013.01); *H04N 21/47205* (2013.01); *H04N 21/4722* (2013.01)

(58) Field of Classification Search
CPC ......... H04N 21/47217; H04N 21/4722; H04N 21/4316; H04N 21/47205
(Continued)

(56) References Cited

U.S. PATENT DOCUMENTS 8,078,603 B1      12/2011   Chandratillake et al.
2005/0081138 A1 *  4/2005   Voss ........................ H04N 21/84
                                                      725/135
(Continued)

FOREIGN PATENT DOCUMENTS

CN      106303669 A      1/2017
CN      106792272 A      5/2017
(Continued)

*Primary Examiner* — Daniel Samwel
(74) *Attorney, Agent, or Firm* — Leydig, Voit & Mayer, Ltd.

(57) ABSTRACT

A picture display method and a related electronic device, includes: displaying a first interface of the gallery application, where the first interface includes a first thumbnail, and the first thumbnail is a thumbnail corresponding to a first video; detecting a first input operation performed by a user on the first thumbnail; obtaining, based on a group ID of the first video, thumbnails of N associated pictures associated with the first video, where the associated pictures are captured pictures in a recording process of the first video; and displaying a video playback interface of the first video, where the video playback interface includes a first display box and a second display box. The first display box is used to display an image of the first video, and the second display box is used to display the thumbnails of the N associated pictures.

20 Claims, 25 Drawing Sheets

(58) Field of Classification Search
USPC .................................................. 715/700–866
See application file for complete search history.

(56) References Cited

U.S. PATENT DOCUMENTS

| | | | | |
|---|---|---|---|---|
| 2007/0180020 A1* | 8/2007 | Woods | ................... | H04L 67/02 |
| | | | | 709/203 |
| 2007/0274563 A1* | 11/2007 | Jung | ................. | H04N 1/00352 |
| | | | | 382/103 |
| 2009/0172543 A1 | 7/2009 | Cronin et al. | | |
| 2009/0217204 A1* | 8/2009 | Yamashita | .............. | G06F 16/51 |
| | | | | 715/838 |
| 2012/0198386 A1* | 8/2012 | Hautala | ............... | G06F 3/04883 |
| | | | | 715/838 |
| 2017/0011773 A1* | 1/2017 | Lee | ...................... | H04N 5/9201 |
| 2018/0285148 A1* | 10/2018 | Dutton | ................. | G06F 9/4843 |
| 2020/0162798 A1* | 5/2020 | Khan | .................... | G06F 3/0484 |
| 2021/0227293 A1* | 7/2021 | Cieslak | .................. | G06Q 50/10 |
| 2021/0382941 A1 | 12/2021 | Wu et al. | | |
| 2022/0174237 A1* | 6/2022 | Du | ....................... | H04N 5/2625 |

FOREIGN PATENT DOCUMENTS

| | | |
|---|---|---|
| CN | 108833787 A | 11/2018 |
| CN | 111061912 A | 4/2020 |
| CN | 111541936 A | 8/2020 |
| CN | 113014993 A | 6/2021 |
| CN | 113810608 A | 12/2021 |
| CN | 111935402 B | 2/2022 |
| EP | 3859561 A1 | 8/2021 |
| WO | 2022007724 A1 | 1/2022 |

\* cited by examiner

METHOD AND RELATED ELECTRONIC DEVICE FOR DISPLAYING A VIDEO AND ASSOCIATED PICTURES

CROSS-REFERENCE TO RELATED APPLICATIONS

This application is a national stage of International Application No. PCT/CN2022/143658, filed on Dec. 29, 2022, which claims priority to Chinese Patent Application No. 202210188529.5, filed on Feb. 28, 2022. The disclosures of both of the aforementioned applications are hereby incorporated by reference in their entireties.

TECHNICAL FIELD

This application relates to the field of picture display, and in particular, to a picture display method and a related electronic device.

BACKGROUND

In response to the development and popularization of computer and internet technologies, the internet also develops toward mobility. A user may access a network through a smartphone to obtain a network service and corresponding network experience. As integration of electronic consumption, computers, and communication (3C) emerges, people pay increasing attention to comprehensive utilization of information devices in various fields, to fully utilize existing resources and devices to provide better service to people.

Currently, application of a video recording function on mobile devices also develops rapidly. However, since photographing is not supported during video recording, which means that a user can obtain only a video but no picture of the video recording process after the video recording is completed, which reduces user experience.

SUMMARY

Embodiments of this application provide a picture display method, which resolves a problem that users cannot browse a picture corresponding to a video at any time while watching the video.

According to a first aspect, an embodiment of this application provides a picture display method applied to an electronic device. The method includes: starting a gallery application; displaying a first interface of the gallery, where the first interface includes a first thumbnail, and the first thumbnail is a thumbnail corresponding to a first video; detecting a first input operation performed by a user on the first thumbnail; obtaining, based on a group ID of the first video, thumbnails of N (N is an integer greater than 0) associated pictures associated with the first video, where the associated pictures are captured pictures in a recording process of the first video, and the group ID is used to identify the first video; and displaying a video playback interface of the first video, where the video playback interface includes a first display box and a second display box, the first display box is used to display an image of the first video, and the second display box is used to display the thumbnails of the N associated pictures.

In the foregoing embodiment, the video and the associated pictures of the video are displayed on the same user interface, so that the user may switch from the video playback interface to a picture preview interface by tapping the thumbnails of the associated pictures of the video on the video playback interface during browsing or playback of the video, thereby browsing the pictures corresponding to the thumbnails. In this way, the user may quickly browse the relevant pictures of the video while watching the video, without a need to perform cumbersome operations such as "exiting video playback-entering the gallery-searching for the associated pictures-browsing the pictures", which greatly saves time for the user and improves user experience.

With reference to the first aspect, in a possible implementation, after the detecting a first input operation performed by a user on the first thumbnail and before the obtaining, based on a group ID of the first video, thumbnails of N associated pictures associated with the first video, the method further includes: reading first information in a media file library, where the first information includes a mapping relationship between a storage path of the first video and the group ID of the first video; and obtaining the group ID of the first video based on first information. In this way, the group ID of the first video can be obtained from the media file library, and the thumbnails of the associated pictures of the first video can be read based on the group ID.

With reference to the first aspect, in a possible implementation, the obtaining, based on a group ID of the first video, thumbnails of N associated pictures associated with the first video includes: reading second information in a media information library based on the group ID of the first video, where the second information includes a mapping relationship among the group ID of the first video, a storage path of the N associated pictures, and the thumbnails of the N associated pictures; and obtaining the thumbnails of the N associated pictures associated with the first video when the storage path of the N associated pictures is read. In this way, after the thumbnails of the associated pictures are read, the thumbnails of the associated pictures of the first video may be displayed on the video playback interface of the first video, so that the user can browse the associated pictures based on the thumbnails.

With reference to the first aspect, in a possible implementation, the video playback interface includes a first positioning control, and after the displaying a video playback interface of the first video, the method further includes: detecting a second input operation performed by the user on the first positioning control, where the first positioning control indicates a first target thumbnail, and the first target thumbnail is a thumbnail in the second display box; obtaining a storage path of a first associated picture from the second information based on the first target thumbnail, where the second information is information in the media information library, the second information includes the mapping relationship among the group ID of the first video, a storage path of the N associated pictures, and the thumbnails of the N associated pictures, and the first target thumbnail is a thumbnail of the first associated picture; retrieving the first associated picture based on the storage path of the first associated picture; and displaying a first preview interface, where the first preview interface includes a first picture preview box and the second display box, where the first picture preview box is used to display the first associated picture, the first positioning control indicates the first target thumbnail, the first target thumbnail is the thumbnail in the second display box, and the first target thumbnail is the thumbnail of the first associated picture. In this way, the user may switch from the video playback interface to the picture preview interface based on the thumbnails of the associated pictures, thereby realizing browsing of the associated pictures.

With reference to the first aspect, in a possible implementation, the video playback interface further includes a first control, the first control is a control displayed when a configuration file exists, the first control is configured to trigger generation of a second video, and the second video is different from the first video. In this way, the user may trigger the electronic device to generate the second video by tapping the first control.

With reference to the first aspect, in a possible implementation, after the displaying a video playback interface of the first video, the method further includes: detecting a third input operation performed by the user on the first control; reading third information based on the group ID of the first video, where the first information includes a mapping relationship between a storage path of a configuration file of the first video and the group ID; retrieving the configuration file of the first video based on the storage path of the configuration file of the first video; processing the first video based on the configuration file of the first video to obtain the second video; and displaying a video playback interface of the second video, where the video playback interface of the second video is different from the video playback interface of the first video, and the video playback interface of the second video includes a first video preview box, and the first video preview box is used to display an image of the second video.

With reference to the first aspect, in a possible implementation, the first preview interface includes the second display box, the second display box includes a second target thumbnail, and after the displaying a first preview interface, the method further includes: detecting an input operation performed by the user on the second target thumbnail; and displaying the video playback interface of the first video. In this way, the user may switch from the preview interface of the associated pictures to the video playback interface of the first video by tapping the second target thumbnail.

With reference to the first aspect, in a possible implementation, a maximum number of the thumbnails of the associated pictures displayed in the second display box is M, the second display box includes a first switching control, and after the displaying a video playback interface of the first video, the method further includes: detecting an input operation performed by the user on the first switching control when N is greater than M; and switching the thumbnails in the second display box, where the thumbnail displayed in the second display box before switching is different from the thumbnail displayed in the second display box after switching. In this way, the second display box can switch the thumbnails of the associated pictures.

According to a second aspect, an embodiment of this application provides an electronic device. The electronic device includes one or more processors and a memory. The memory is coupled to the one or more processors, and is configured to store computer program code. The computer program code includes computer instructions, and the one or more processors call the computer instructions to cause the electronic device to perform the following operations: starting a gallery application; displaying a first interface of the gallery, where the first interface includes a first thumbnail, and the first thumbnail is a thumbnail corresponding to a first video; detecting a first input operation performed by a user on the first thumbnail; obtaining, based on a group ID of the first video, thumbnails of N associated pictures associated with the first video, where the associated pictures are captured pictures in a recording process of the first video, and the group ID is used to identify the first video; and displaying a video playback interface of the first video, where the video playback interface includes a first display box and a second display box, the first display box is used to display an image of the first video, and the second display box is used to display the thumbnails of the N associated pictures.

With reference to the second aspect, in a possible implementation, the one or more processors are further configured to call the computer instructions to cause the electronic device to perform the following operations: reading first information in a media file library, where the first information includes a mapping relationship between a storage path of the first video and the group ID of the first video; and obtaining the group ID of the first video based on first information.

With reference to the second aspect, in a possible implementation, the one or more processors are further configured to call the computer instructions to cause the electronic device to perform the following operations: reading second information in a media information library based on the group ID of the first video, where the second information includes a mapping relationship among the group ID of the first video, a storage path of the N associated pictures, and the thumbnails of the N associated pictures; and obtaining the thumbnails of the N associated pictures associated with the first video when the storage path of the N associated pictures is read.

With reference to the second aspect, in a possible implementation, the one or more processors are further configured to call the computer instructions to cause the electronic device to perform the following operations: detecting a second input operation performed by the user on the first positioning control, where the first positioning control indicates a first target thumbnail, and the first target thumbnail is a thumbnail in the second display box; obtaining a storage path of a first associated picture from the second information based on the first target thumbnail, where the second information is information in the media information library, the second information includes the mapping relationship among the group ID of the first video, a storage path of the N associated pictures, and the thumbnails of the N associated pictures, and the first target thumbnail is a thumbnail of the first associated picture; retrieving the first associated picture based on the storage path of the first associated picture; and displaying a first preview interface, where the first preview interface includes a first picture preview box and the second display box, where the first picture preview box is used to display the first associated picture, the first positioning control indicates the first target thumbnail, the first target thumbnail is the thumbnail in the second display box, and the first target thumbnail is the thumbnail of the first associated picture.

With reference to the second aspect, in a possible implementation, the one or more processors are further configured to call the computer instructions to cause the electronic device to perform the following operations: detecting a third input operation performed by the user on the first control; reading third information based on the group ID of the first video, where the first information includes a mapping relationship between a storage path of a configuration file of the first video and the group ID; retrieving the configuration file of the first video based on the storage path of the configuration file of the first video; processing the first video based on the configuration file of the first video to obtain the second video; and displaying a video playback interface of the second video, where the video playback interface of the second video is different from the video playback interface of the first video, and the video playback interface of the second video includes a first video preview box, and the first video preview box is used to display an image of the second video.

With reference to the second aspect, in a possible implementation, the one or more processors are further configured to call the computer instructions to cause the electronic device to perform the following operations: detecting an input operation performed by the user on the second target thumbnail; and displaying the video playback interface of the first video.

With reference to the second aspect, in a possible implementation, the one or more processors are further configured to call the computer instructions to cause the electronic device to perform the following operations: detecting an input operation performed by the user on the first switching control when N is greater than M; and switching the thumbnails in the second display box, where the thumbnail displayed in the second display box before switching is different from the thumbnail displayed in the second display box after switching.

According to a third aspect, an embodiment of this application provides an electronic device, including a touch screen, a camera, one or more processors, and one or more memories. The one or more processors are coupled to the touchscreen, the camera, and the one or more memories, the one or more memories are configured to store computer program code, the computer program code includes computer instructions, and when the one or more processors execute the computer instructions, the electronic device is caused to perform the method according to the first aspect or any one of the possible implementations of the first aspect.

According to a fourth aspect, an embodiment of this application provides a chip system. The chip system is applied to an electronic device, the chip system includes one or more processors, and the one or more processors are configured to call computer instructions, so that the electronic device performs the method according to the first aspect or any one of the possible implementations of the first aspect.

According to a fifth aspect, an embodiment of this application provides a computer program product including instructions. When the computer program product is executed on an electronic device, the electronic device is caused to perform the method according to the first aspect or any one of the possible implementations of the first aspect.

According to a sixth aspect, an embodiment of this application provides a computer-readable storage medium including instructions. When the instructions are executed on an electronic device, the electronic device is caused to perform the method according to the first aspect or any one of the possible implementations of the first aspect.

DESCRIPTION OF EMBODIMENTS

Figure 1A:
FIG. 1A to FIG. 1H are diagrams of a group of example user interfaces according to an embodiment of this application.

The technical solutions in the embodiments of this application are clearly and completely described below with reference to the drawings in the embodiments of this application. Apparently, the described embodiments are merely some of the embodiments of this application rather than all of the embodiments. The "embodiment" mentioned herein means that a particular feature, structure, or characteristic described with reference to the embodiments may be included in at least one embodiment of this embodiment. The phrase appearing at various locations in this specification does not necessarily indicate a same embodiment, and is not an independent or alternative embodiment exclusive to another embodiment. It may be understood explicitly and implicitly by a person skilled in the art that the embodiments described herein may be combined with another embodiment. All other embodiments obtained by a person of ordinary skill in the art based on the embodiments of this application without creative efforts shall fall within the protection scope of this application.

The terms "first", "second", "third" and the like in the description and claims of this application and the accompanying drawings are used to distinguish different objects, and are not used to describe a specific sequence. In addition, the terms "include", "have", and any variant thereof are intended to cover a non-exclusive inclusion. For example, processes, methods, systems, products, or devices including a series of steps or modules optionally include steps or units not listed, or optionally include another step or unit inherent to these processes, methods, products, or devices.

The accompanying drawings show only parts related to this application rather than all content of this application. Before example embodiments are discussed in more detail, it is to be noted that some example embodiments are described as processing or methods that are depicted as flowcharts. Although the flowcharts describe various operations (or steps) as sequential processing, many of the operations may be implemented in parallel, concurrently, or simultaneously. In addition, the sequence of operations may be rescheduled. The processing may be terminated when the operations of the processing are completed. However, there may be further additional steps not included in the accompanying drawings. The processing may correspond to a method, a function, a procedure, a subroutine, and the like.

The terms "component", "module", "system", "unit" and the like used in this specification are used to represent computer-related entities, hardware, firmware, a combination of hardware and software, software, or software in execution. For example, the unit may be, but is not limited to, a process running on a processor, a processor, an object, an executable file, a thread of execution, or a program, and/or may be distributed between two or more computers. In addition, these units are executable from various computer-readable media having various data structures stored thereon. For example, a unit may communicate through local and/or remote processes based on a signal with one or more data packets (for example, second unit data exchanged by another unit from a local system, a distributed system, and/or a network, for example, an internet that interacts with another system by using a signal).

Nowadays, as the smartphone technology continuously develops, increasing users like taking photos and recording videos through a camera function in mobile phones, to record every detail in life. In particular, when a user records a video through a camera, the user may want to obtain some pictures associated with the recording, for example, a picture of a highlight in the video recording process. In addition, an electronic device can process these pictures (for example, recognizing scenes through AI algorithms, adding corresponding filters, and the like) to obtain pictures with a better visual effect.

However, current electronic devices display pictures and videos independently. To be specific, during browsing of a video, if the user wants to browse pictures associated with the video, the user needs to exit a current video playback interface, and then searches for the associated pictures of the video in a gallery application to browse the associated pictures of the video. If the user wants to watch the video again after browsing pictures, the user needs to exit a current picture preview interface and search for the target video again to play and browse the target video. In this case, the step the user needs to perform to browse the associated pictures of the video while watching the video is cumbersome and wastes time of the user, which greatly increases a time cost and reduce use experience of the user.

In order to resolve the foregoing problem that the video and the associated pictures thereof cannot be displayed together, an embodiment of this application provides a picture display method. The method includes: When an electronic device enables a function of obtaining pictures related to recorded videos, after recording of a video is completed, when a user browses the recorded video, the electronic device displays a thumbnail of an associated picture of the video on a video playback interface. After a tapping operation performed by the user on the thumbnail is detected, the electronic device displays a picture preview interface. The picture preview interface displays a picture corresponding to the thumbnail. The user may share, edit, delete, and forward the picture in the picture preview interface. Through the foregoing picture display method, the user may browse the associated pictures of the video at any time while watching the video, without a need to perform a series of cumbersome operations such as "exiting the video playback interface-searching the gallery for the associated pictures-browsing the associated pictures", which greatly reduces a time cost for browsing the pictures for the user and improves user experience.

An application scenario of a picture display method provided in an embodiment of this application is described below with reference to FIG. 1A to FIG. 1H. FIG. 1A to FIG. 1H show a group of example user interfaces according to an embodiment of this application.

As shown in FIG. 1A, a user interface 10 is a main interface (also referred to as a desktop, a home screen, or the like) of an electronic device 100. The main interface includes a gallery icon 101, a camera icon 102, and another functional icon. When the electronic device 100 detects an input operation (for example, tapping) on the camera icon 102, the electronic device 100 displays a user interface 11 shown in FIG. 1B in response to the input operation.

Figure 1B:
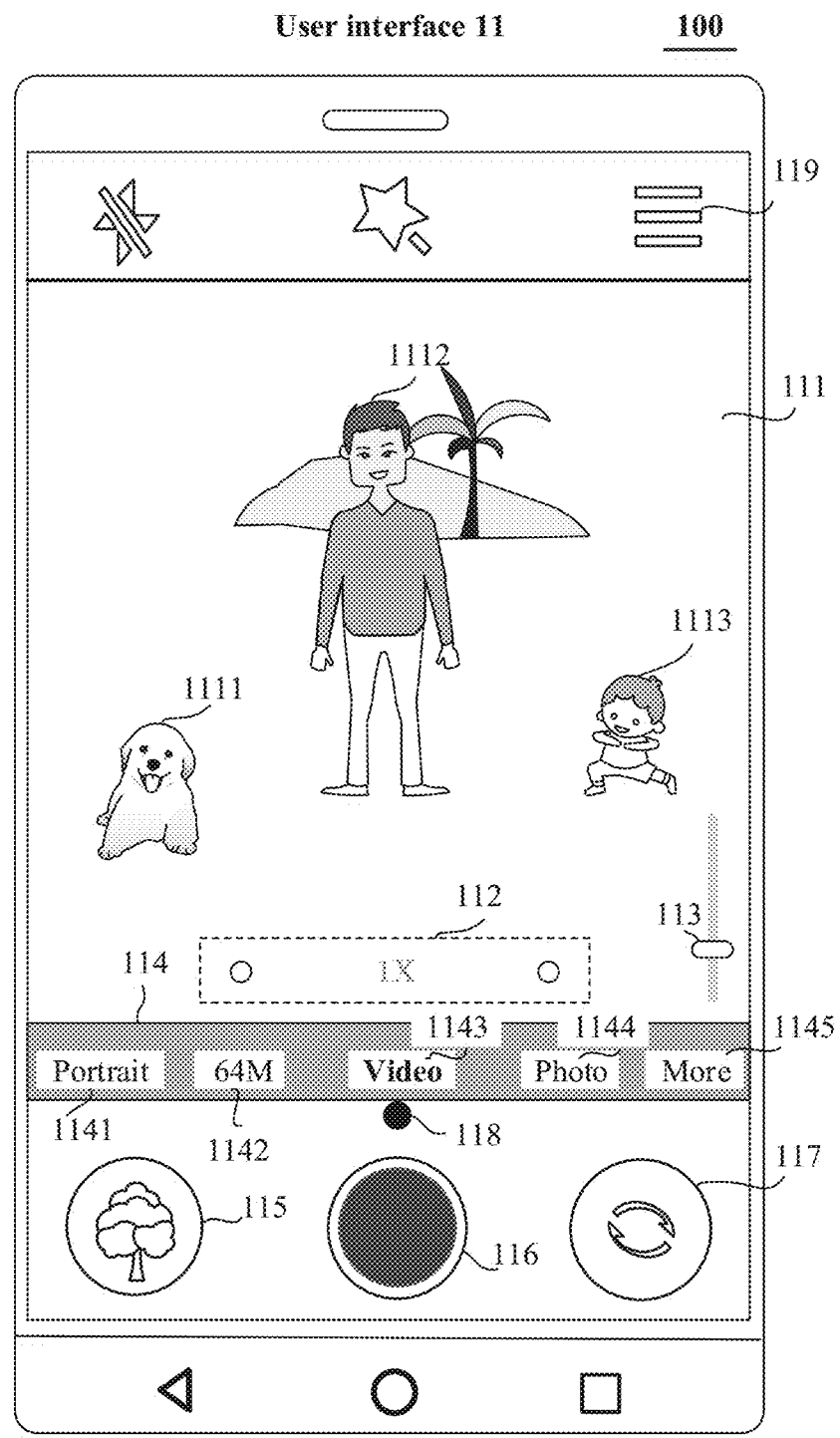

As shown in FIG. 1B, the user interface 11 is a photographing interface of the electronic device 100. The photographing interface includes a preview area 111, a zoom factor display box 112, a zoom factor adjustment control 113, a function area 114, a gallery control 115, a start control 116, an echo control 117, a function indicator icon 118, and a "more functions" control 119. The preview area 111 is configured to display a real-time preview picture of a photographing environment obtained through a camera. The preview area 111 includes a first to-be-photographed object 1111, a second to-be-photographed object 1112, and a third to-be-photographed object 1113. The zoom factor display box 112 is configured to display a zoom factor of the preview picture in the preview area 111. 1× is a zoom factor of 1, 2× is a zoom factor of 2, 3× is a zoom factor of 3, and so on. The zoom factor is positively correlated with a focal length of the picture. A larger zoom factor indicates a larger focal length of the picture and a larger to-be-photographed object in the to-be-photographed picture. It may be learned from FIG. 1B that, a zoom factor of a current preview picture is the zoom factor of 1. The echo control 117 is configured to switch the electronic device 100 between a front camera and a rear camera. When the rear camera of the electronic device 100 is currently operating, if a tapping operation performed by a user on the echo control 117 is detected, the electronic device 100 switches the operating camera to the front camera in response to the operation. At this time, in the preview area 111, a preview picture obtained through the front camera is displayed, and a preview picture obtained through the rear camera is not displayed. When the front camera of the electronic device 100 is currently operating, if a tapping operation performed by a user on the echo control 117 is detected, the electronic device 100 switches the operating camera to the rear camera in response to the operation. At this time, in the preview area 111, a preview picture obtained through the rear camera is displayed, and a preview picture obtained through the front camera is not displayed. After the electronic device 100 detects an input operation performed on the gallery control 115, the electronic device 100 displays a gallery interface, so that the user may preview the video recorded by or picture photographed by the electronic device 100. The function area 114 is used for the camera to apply a current function mode. The function area 114 includes a "portrait" control 1141, a "64M" control 1142, a "video" control 1143, a "photo" control 1144, a "more" control 1145, and the function indicator icon 118. The function indicator icon 118 is configured to indicate a current photographing mode of the electronic device. As shown in FIG. 1B, the function indicator icon is located below the "video" control 1143, and the current photographing mode of the electronic device 100 is a video mode. The zoom factor adjustment control 113 is configured to adjust the zoom factor of the preview picture. When the electronic device 100 detects an input operation (for example, sliding up) performed on the zoom factor adjustment control 113, the electronic device increases the zoom factor of the preview picture in response to the input operation, to display a user interface 12 shown in FIG. 1C.

Figure 1C:
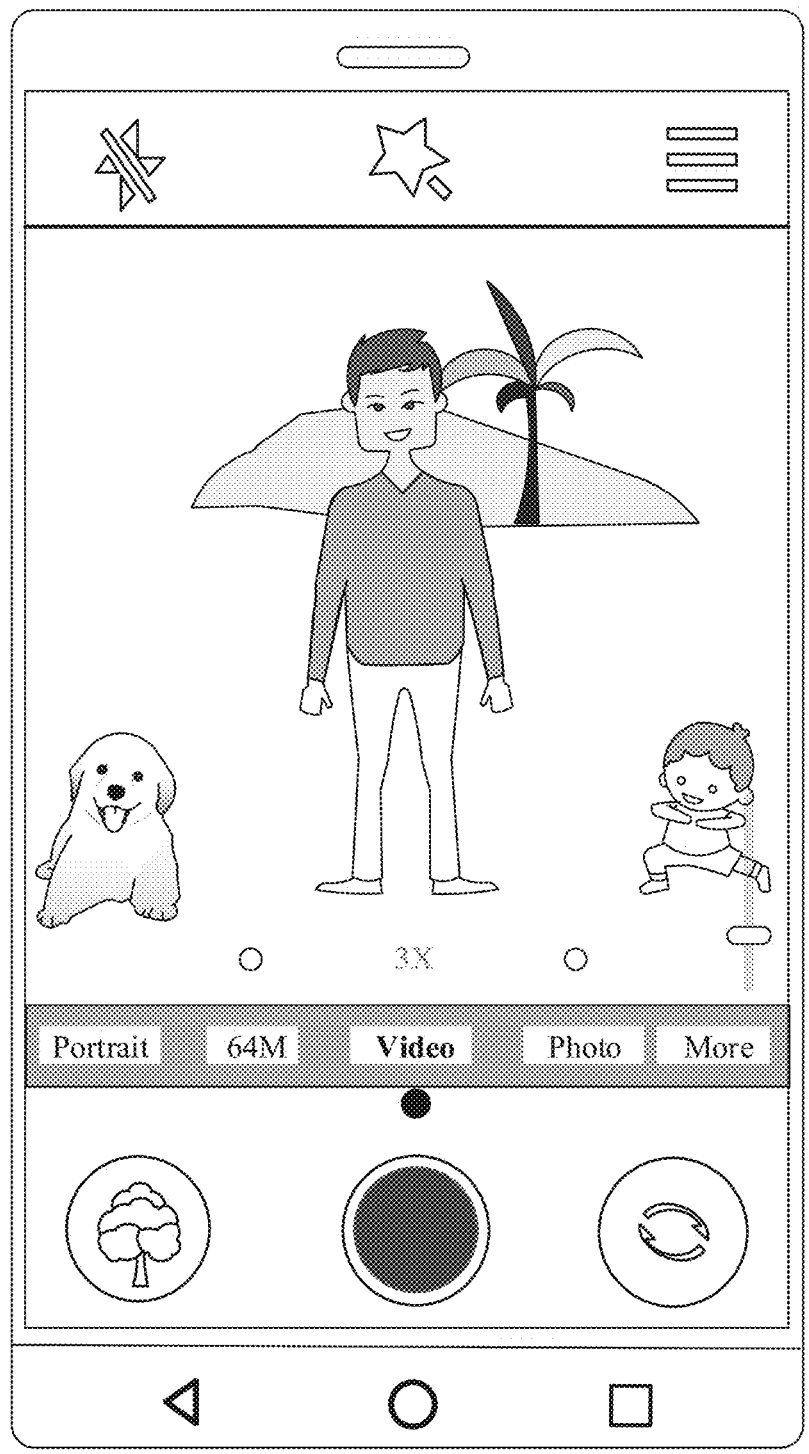

As shown in FIG. 1C, the user interface 12 is the photographing interface of electronic device 100. It may be learned from the zoom factor display box that a zoom factor of a current preview picture is the zoom factor of 3. The first to-be-photographed object, the second to-be-photographed object, and the third to-be-photographed object in the preview area are enlarged compared to the to-be-photographed object in FIG. 1B. When the electronic device 100 detects an input operation (for example, tapping) performed on the "more functions" control, the electronic device 100 displays an electronic device 13 shown in FIG. 1D in response to the input operation.

Figure 1D:
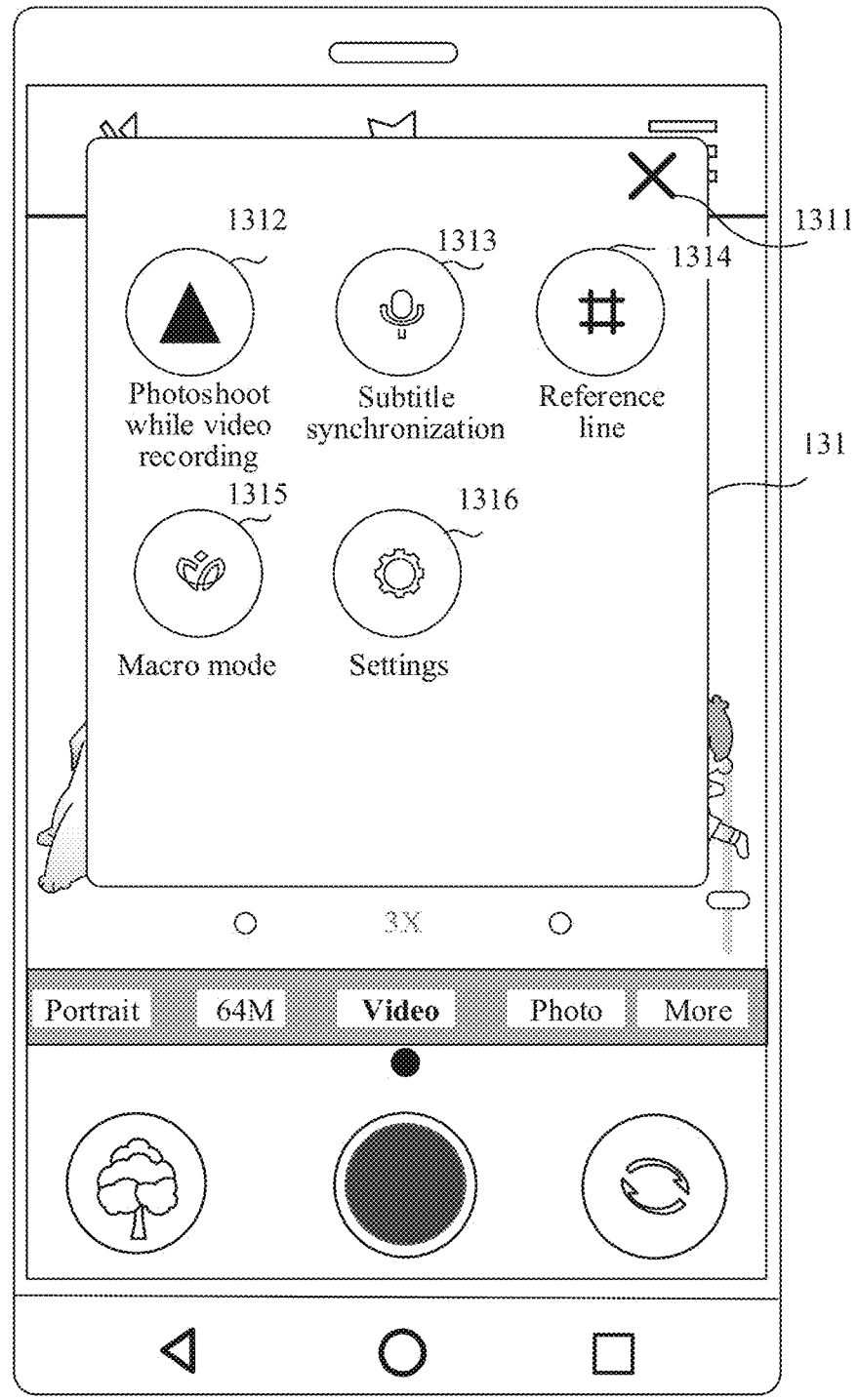

As shown in FIG. 1D, the user interface 13 includes a "more functions" display area 131. The "more functions" display area 131 includes a return control 1311, a "photoshoot while video recording" control 1312, a "subtitle synchronization" control 1313, a "reference line" control 1314, a "macro mode" control 1315, and a "settings" control 1316. The "photoshoot while video recording" control 1312 is configured to enable a photoshoot while video recording function, that is, a photographing function enabling the electronic device to obtain all or partial associated pictures of a video and process and save these pictures while recording the video, to obtain both the video and the pictures. The associated pictures of the video may be pictures of highlights of the video. After the electronic device 100 detects an input operation (for example, tapping) performed on the "photoshoot while video recording" control 1312, the electronic device 100 displays a user interface 14 shown in FIG. 1E in response to the input operation.

Figure 1E:
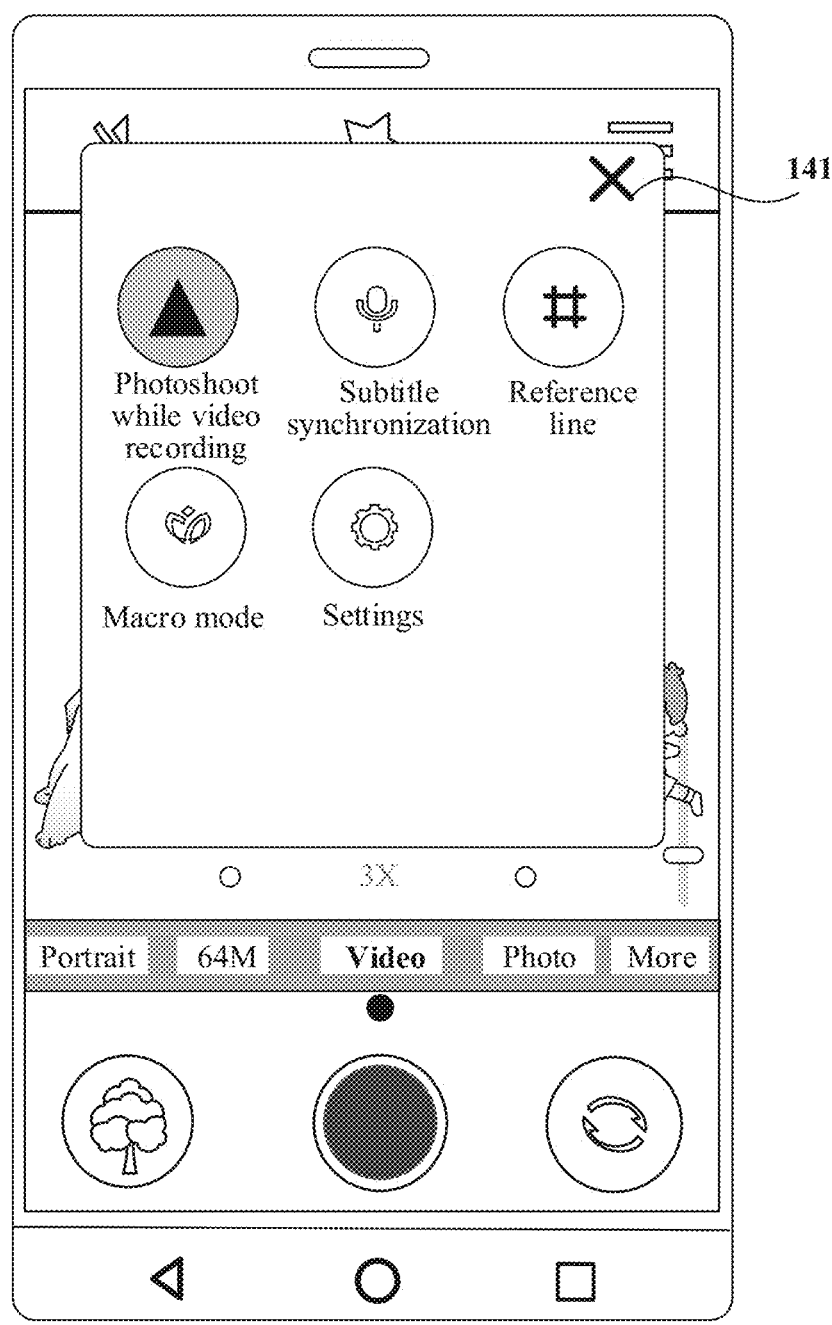

As shown in FIG. 1E, a color of the "photoshoot while video recording" control in the user interface 14 is different from a color of the "photoshoot while video recording" control in the user interface 13, to indicate that electronic device 100 has enabled the photoshoot while video recording function. When the electronic device 100 detects an input operation performed on the return control 141, the electronic device 100 displays a user interface 12 shown in FIG. 1G in response to the operation. For a related description of the user interface 12, refer to the related description of the foregoing user interface 12 in FIG. 1C. Details are not described in this embodiment of this application.

Figure 1F:
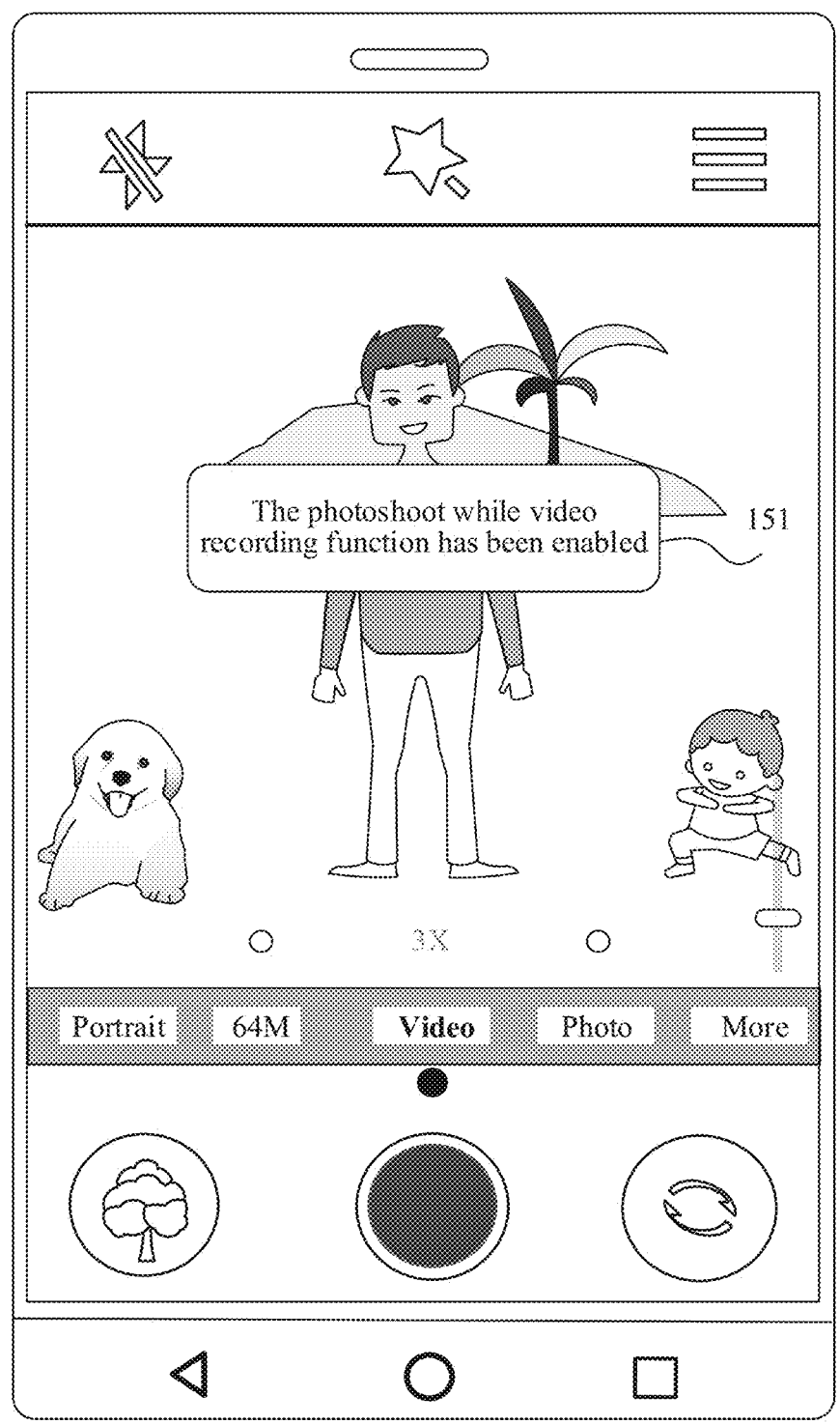
Figure 1G:
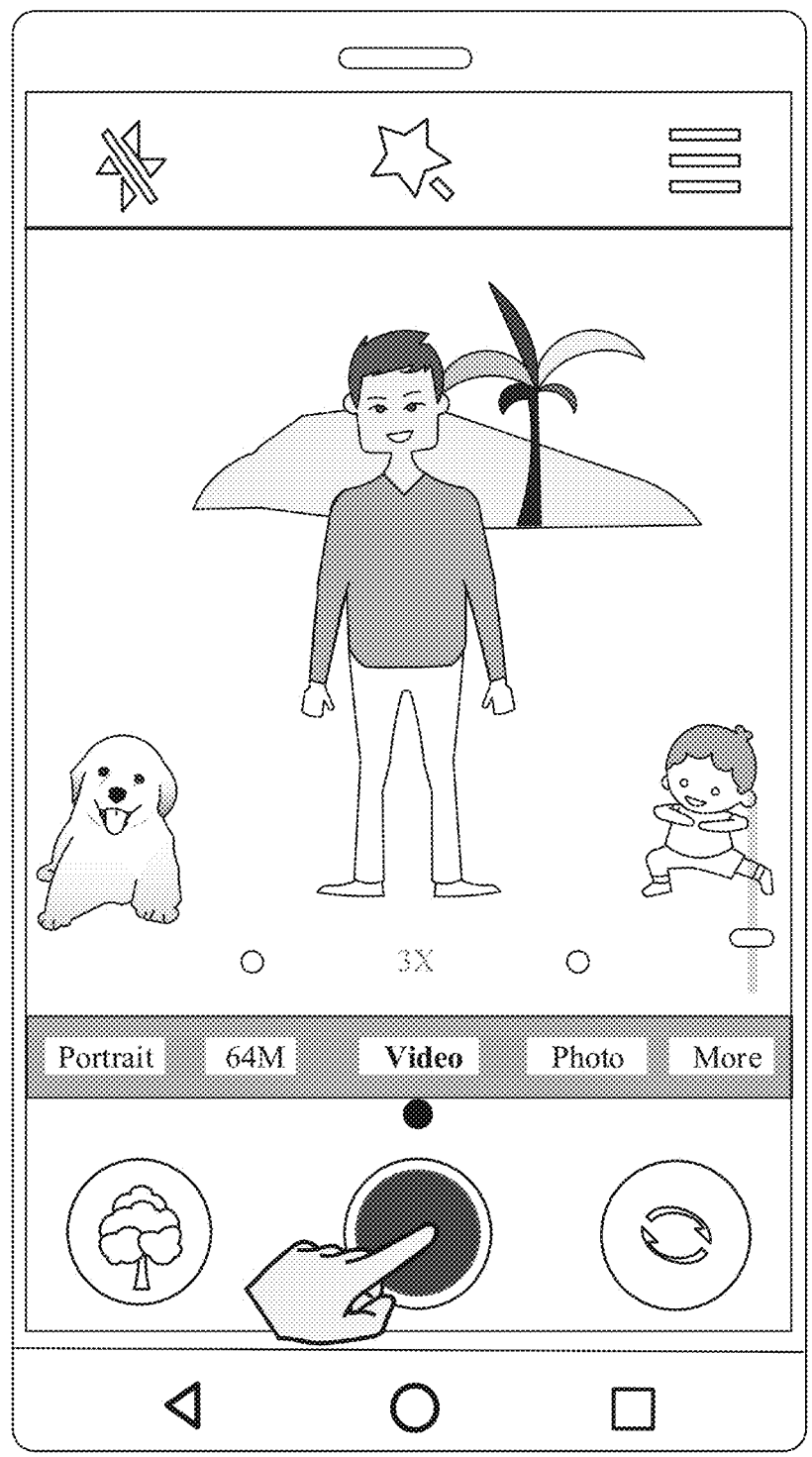

In a possible implementation, after the electronic device 100 detects an input operation such as tapping performed on the "photoshoot while video recording" control, the electronic device 100 may display a user interface 15 shown in FIG. 1F in response to the operation. The user interface 15 includes a prompt box 151. The prompt box 151 is used to prompt the user that the photoshoot while video recording function has been enabled. As shown in FIG. 1F, the prompt box 151 includes text information "the photoshoot while video recording function has been enabled". As shown in FIG. 1F, when the electronic device 100 detects a tapping operation performed on the start control, the electronic device 100 starts video recording and displays a user interface 16 shown in FIG. 1H in response to the operation.

In some other embodiments, the electronic device 100 may display the "photoshoot while video recording" control on the user interface 12. After detecting a tapping operation performed on the "photoshoot while video recording" control, the electronic device 100 enables the photoshoot while video recording function in response to the operation.

It is to be understood that FIG. 1C to FIG. 1F provide merely example descriptions of the electronic device 100 when enabling the "photoshoot while video recording" function, and does not constitute a limitation on the protection scope of this embodiment of this application. The manner in which the electronic device 100 enables the "photoshoot while video recording" function is not limited in this embodiment of this application.

Figure 1H:
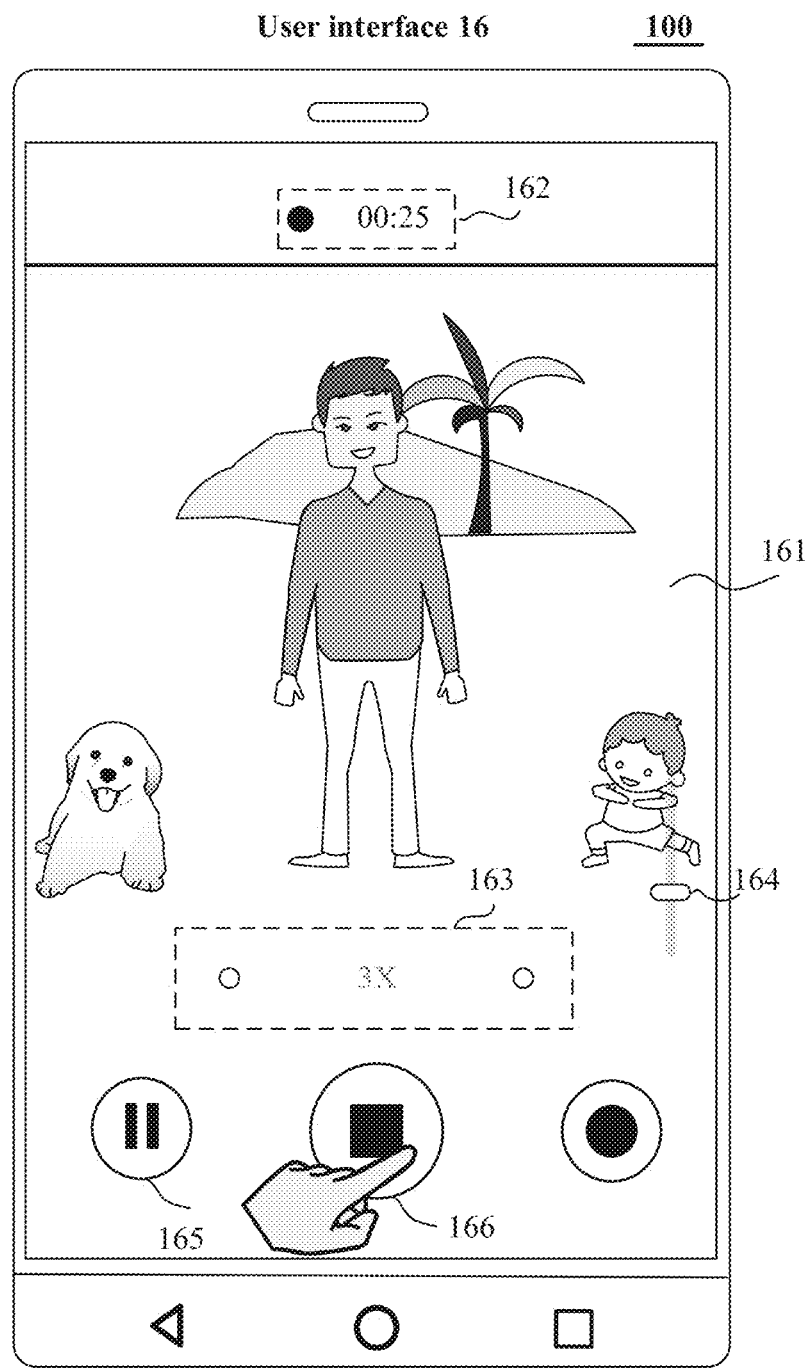

As shown in FIG. 1H, the user interface 16 is a video recording interface. The video recording interface includes a preview picture display area 161, a recording time display area 162, a zoom factor display area 163, a zoom factor adjustment control 164, a recording pause control 165, and a recording stop control 166. The preview picture display area 161 is configured to display a preview picture of a current photographing environment in real time, and the recording time display area 162 is configured to display a recording time of a current video, as shown in FIG. 1H. It may be learned from the recording time display area 162 that the recording time of the current video is 25 s. The ratio magnification display area 163 is configured to display a zoom factor of the current preview picture. It may be learned from the zoom factor display area 163 that the zoom factor of the current preview picture is the zoom factor of 3. The zoom factor adjustment control 164 is configured to adjust the zoom factor of the preview picture. For a related description of the zoom factor adjustment control 164, refer to the related description of the foregoing zoom factor adjustment control 113 in FIG. 1B. Details are not described in this embodiment of this application. The recording pause control 165 is used for the user to pause the current video recording. After the electronic device 100 detects a tapping operation performed on the recording pause control 165, the electronic device 100 pauses the video recording in response to the operation. The recording stop control 166 is used for the user to stop the video recording. As shown in FIG. 1H, after the electronic device 100 detects a tapping operation performed on the recording stop control 166, the electronic device 100 stops the video recording and saves the video and associated pictures of the video in response to the operation.

The video recording application scenario in which the electronic device 100 enables the "photoshoot while video recording" function is described above with reference to FIG. 1A to FIG. 1H. An application scenario of playing the video recorded in the application scenario of FIG. 1A to FIG. 1H is described below with reference to FIG. 2A to FIG. 2K. In this embodiment of this application, that the video recorded in FIG. 1A to FIG. 1H is a video 1 is used as an example for description. FIG. 2A to FIG. 2J provide a group of example user interfaces according to an embodiment of this application.

Figure 2A:
FIG. 2A to FIG. 2K are diagrams of another group of example user interfaces according to an embodiment of this application.

As shown in FIG. 2A, a user interface 20 is a main interface of an electronic device 100. The main interface includes a gallery icon 201 and another functional icon. When detecting an input operation (for example, tapping) performed on the gallery icon 201, the electronic device 100 displays a user interface 21 shown in FIG. 2B in response to the operation.

Figure 2B:
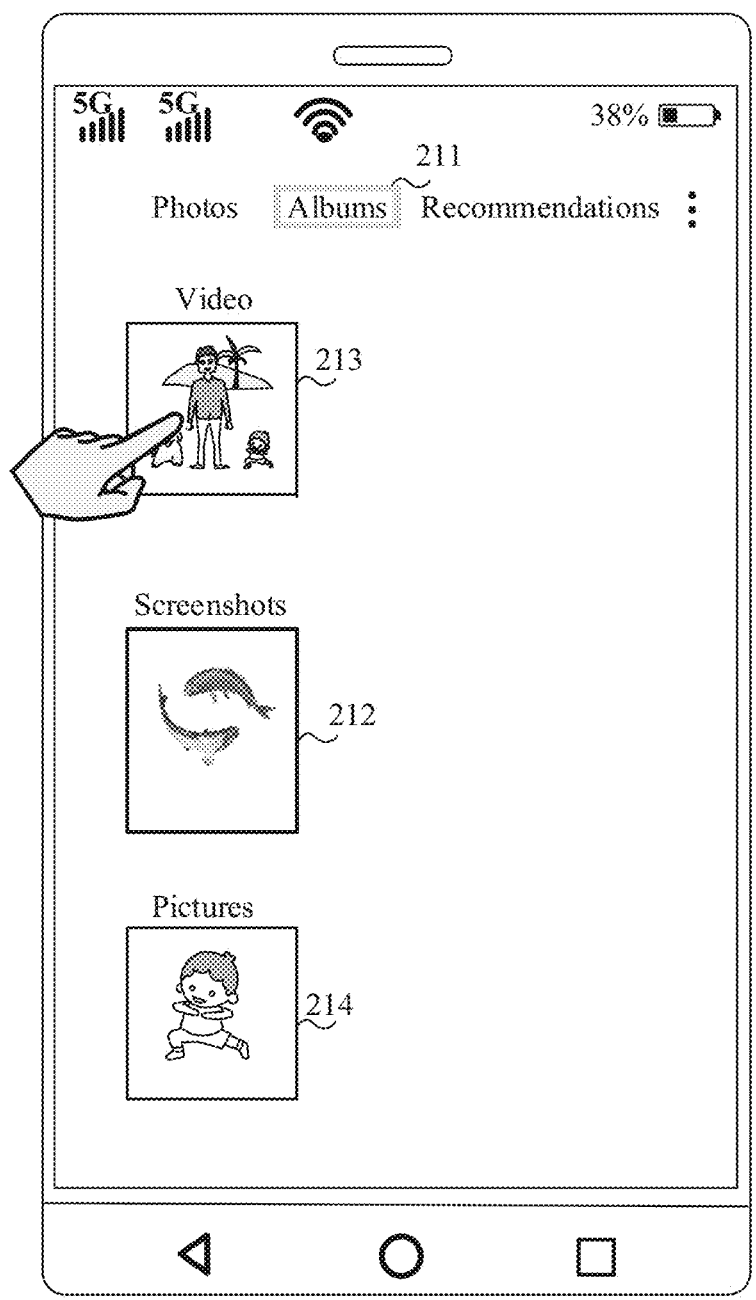

As shown in FIG. 2B, the user interface 21 is an album display interface. The album display interface includes an "album" icon 211, a screenshot icon 212, a video icon 213, and a picture icon 214. The screenshot icon 212 is an icon of a set of screenshot files stored by the electronic device 100. When detecting a tapping operation performed by the user on the screenshot icon 212, the electronic device 100 displays thumbnails of the stored screenshot pictures. The video icon 213 is an icon of a set of video files stored by the electronic device. When detecting a tapping operation performed by the user on the video icon 213, the electronic device 100 displays thumbnails of the stored video files. The picture icon 214 is an icon of a set of associated picture files stored by electronic device 100. The associated picture files stored by electronic device 100 are associated picture files of the video. After the electronic device 100 detects the tapping operation performed on the picture icon 214, the electronic device 100 displays thumbnails of the stored associated picture files. When the electronic device 100 detects a tapping operation performed on the video icon 213, the electronic device 100 displays a user interface 22 shown in FIG. 2C in response to the operation.

Figure 2C:
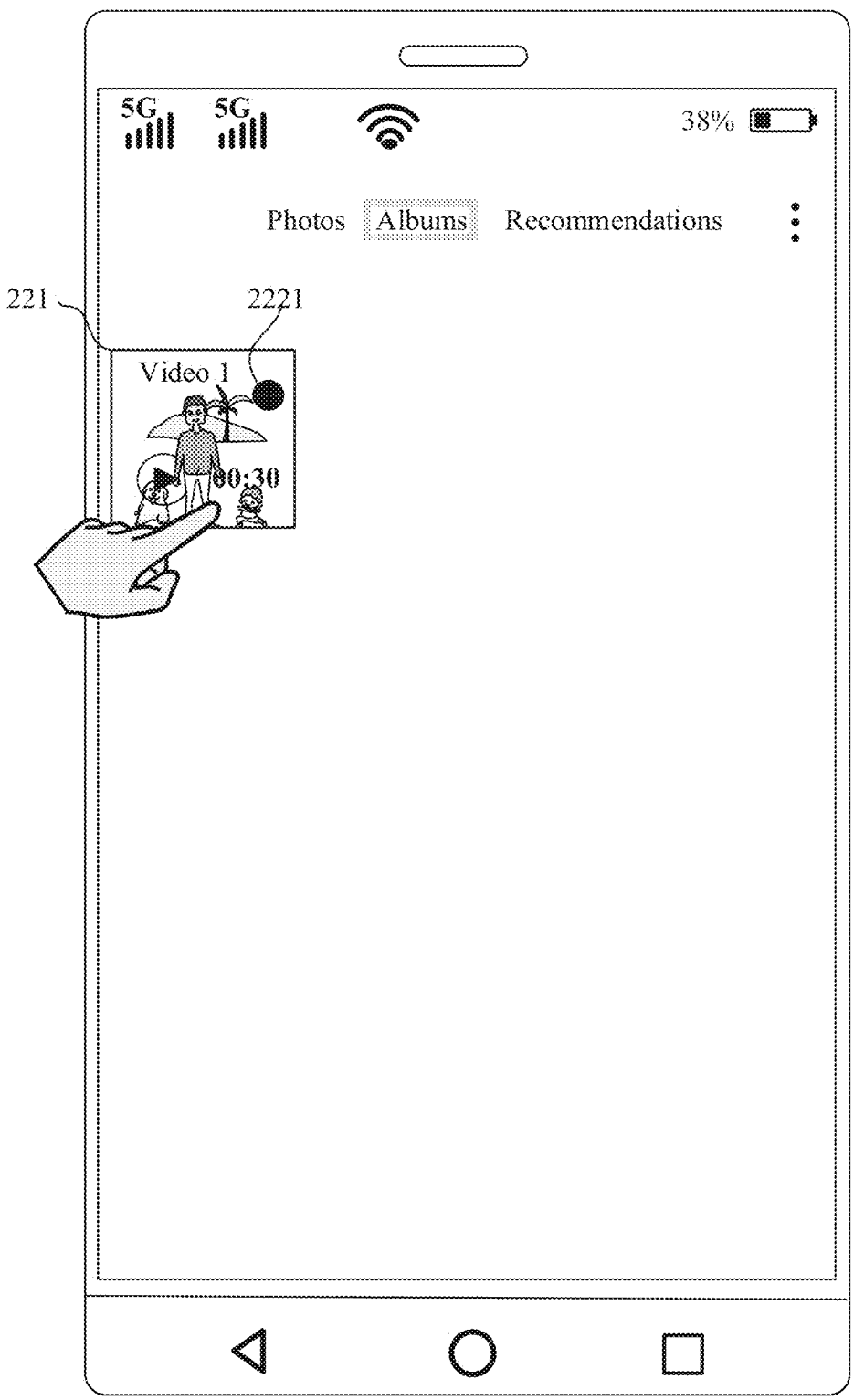

As shown in FIG. 2C, the user interface 22 is a video display interface. The video display interface is configured to display the thumbnails of the video files stored by the electronic device 100. As shown in FIG. 2C, the video display interface includes a thumbnail 221 of a video 1. The thumbnail 221 includes a picture indicator icon 2221. The picture indicator icon 2221 is configured to indicate that the video 1 includes associated pictures obtained through the "photoshoot while video recording" function. The thumbnail 221 may further display a duration of the video 1. It may be learned from the thumbnail 221 that the duration of the video 1 is 30 seconds. When the electronic device 100 detects a tapping operation performed on the thumbnail 221, the electronic device 100 displays a user interface 23 shown in FIG. 2D in response to the operation.

Figure 2D:
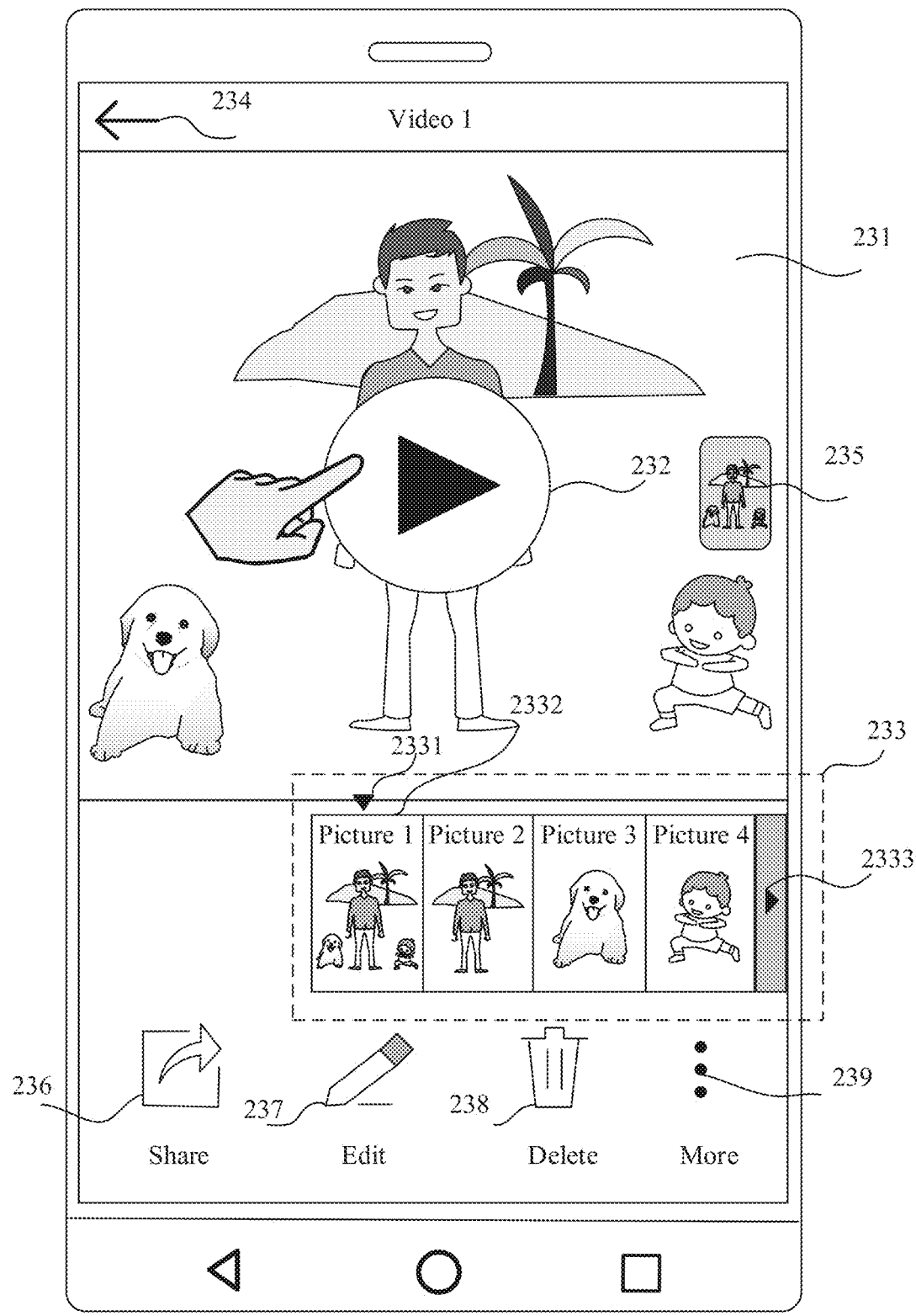

As shown in FIG. 2D, the user Interface 23 is a video playback interface of a gallery APP. The video playback interface includes a video display area 231, a first video playback control 232, a picture display area 233, a return control 234, a video generation control 235, a video share control 236, a video edit control 237, a video deletion control 238, and a "more" control 239.

The video display area 231 is configured to display a video. The video share control 236 is configured to trigger the electronic device 100 to share a video. After the electronic device 100 detects a tapping operation performed on the video share control 236, the electronic device 100 forwards the video in response to the operation. The first video playback control 232 is configured to trigger playback of the video 1. The video edit control 237 is configured to trigger the electronic device to edit the video. When the electronic device 100 detects a tapping operation performed on the video edit control 237, the electronic device 100 may edit the video 1 (for example, perform operations such as editing on the video). The video deletion control 238 is used for the user to delete the video. If the electronic device 100 detects a tapping operation performed on the video deletion control 238, the electronic device 100 may delete the video 1.

The picture display area 233 is configured to display thumbnails of associated pictures of the video 1. The picture display area 233 may include thumbnails of a picture 1 to a picture 4. The picture 1 is the thumbnail of the video 1 (which may be a cover of the video 1), and the picture 2 to the picture 4 are the associated pictures of the video 1. The associated pictures may be highlight pictures in a recording process of the video 1. Certainly, the picture display area 233 may include more or fewer associated pictures of the video 1. The picture display area 233 may further include an indicator icon 2331. The indicator icon 2331 is configured to locate the thumbnail in the picture display area 233. As shown in FIG. 2D, the current indicator icon 2331 is located over the thumbnail 2332 of the picture 1, indicating that a current interface is a playback interface of the video 1. The picture display area 233 may further include a sliding control 2333. After the electronic device 100 detects a tapping operation performed on the first video playback control 232, the electronic device 100 plays the video 1 and displays a user interface 24 shown in FIG. 2E in response to the operation.

Figure 2E:
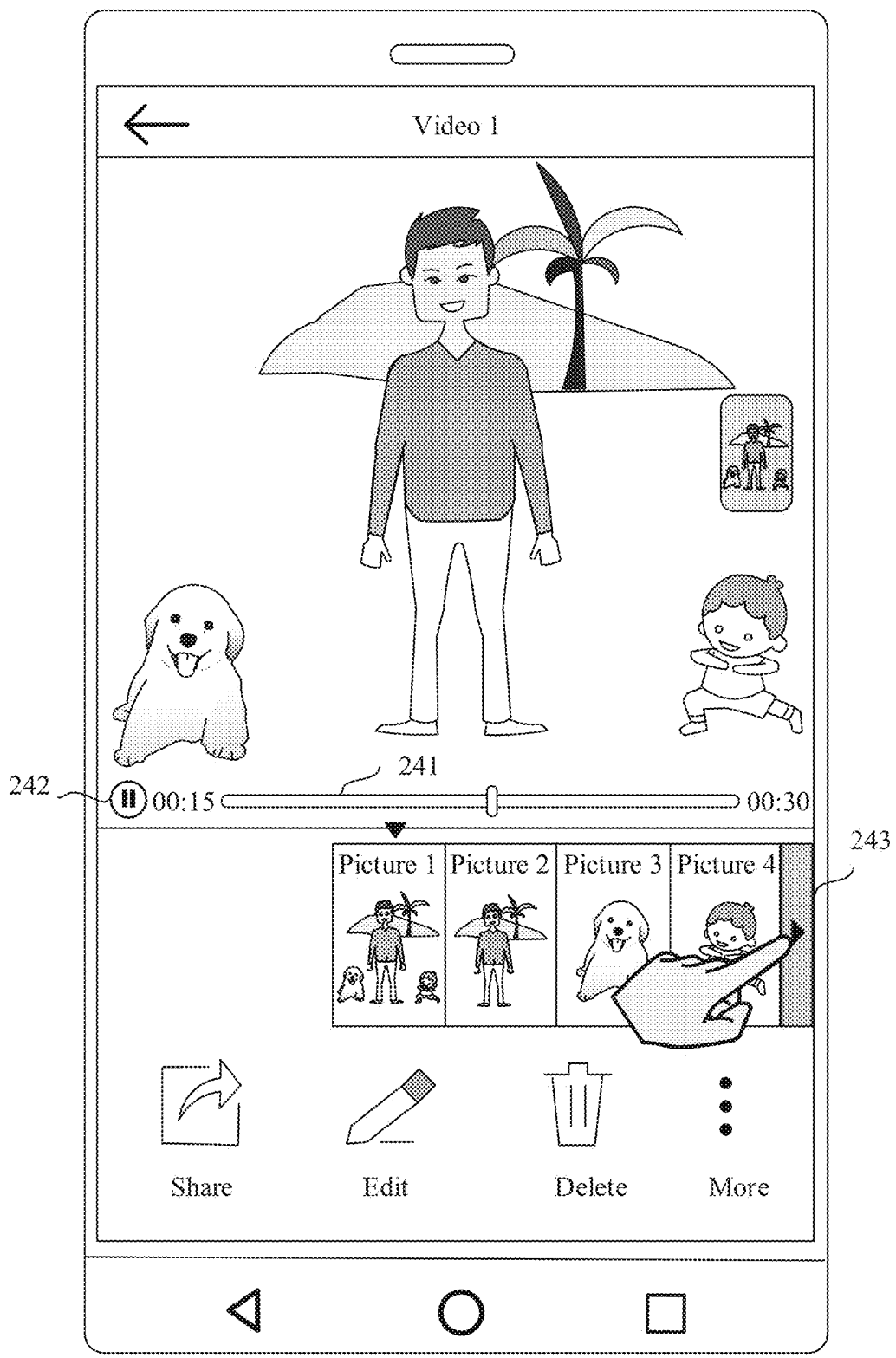

As shown in FIG. 2E, the user interface 24 is a video playback interface, and the video playback interface is configured to play a video. The video playback interface includes a progress bar 241 and a pause control 242. The progress bar 241 is configured to display a current playback progress of the video 1. It may be learned from the progress bar 241 that a playback progress of the video 1 is 15 seconds. The pause control 242 is configured to pause playback of a video. When the electronic device 100 detects a tapping operation performed on the pause control 242, the electronic device 100 may pause the playback of the video 1. When the electronic device 100 detects a tapping operation performed on the sliding control 243, the electronic device 100 displays a user interface 25 shown in FIG. 2F.

In some embodiments, due to a limited display space of the picture display area (for example, the foregoing picture display area 233), only a fixed number of thumbnails can be displayed (for example, only thumbnails of four pictures can be displayed). When a number of the associated pictures of the video exceeds a maximum number of thumbnails that can be displayed in the picture display area, the user may view a thumbnail of another picture by tapping the sliding control.

Figure 2F:
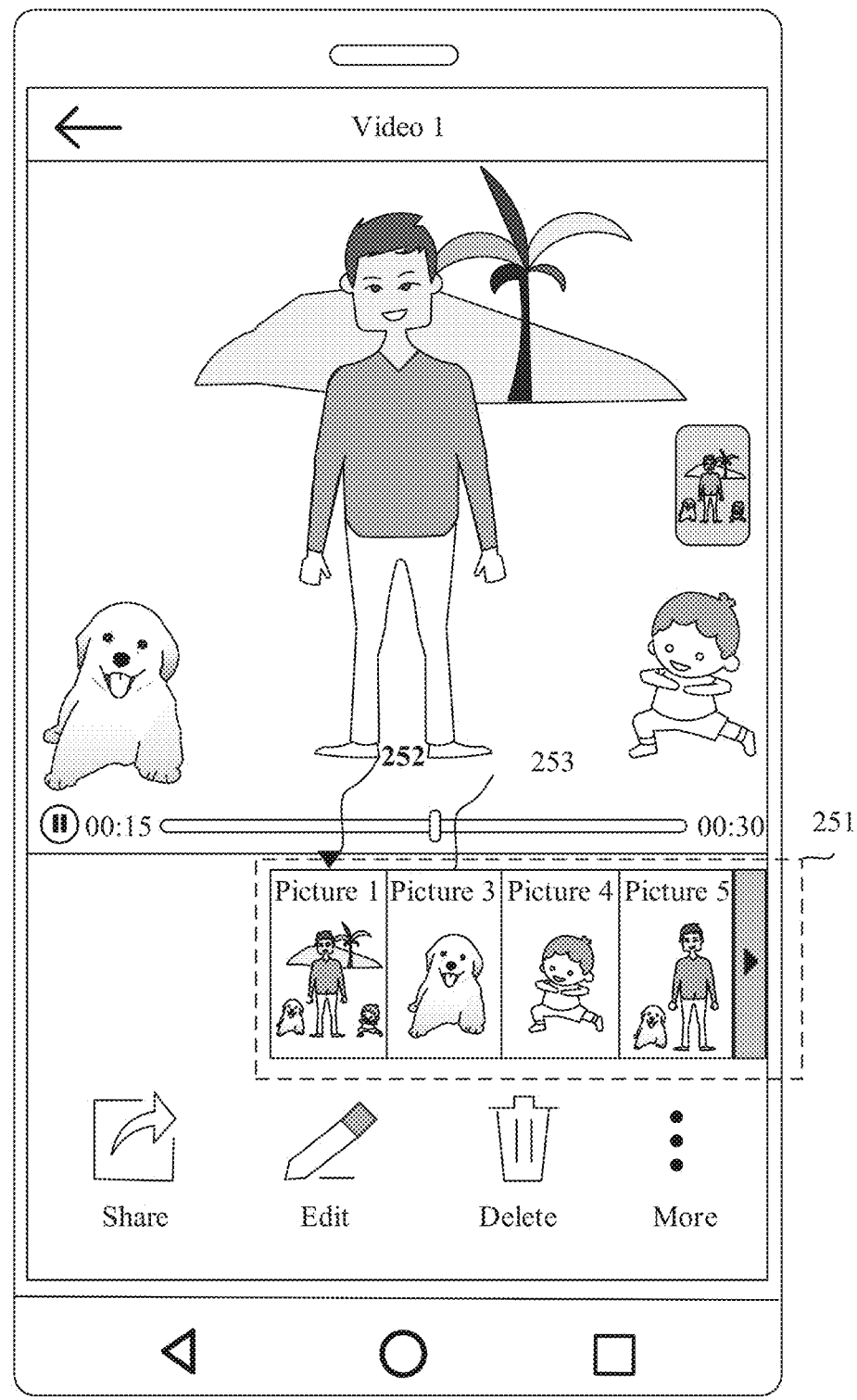

As shown in FIG. 2F, the user interface 25 is a video playback interface. In the video playback interface, the picture display area 251 displays the thumbnails of the picture 1 and the picture 3 to a picture 5. Compared with the picture display area in FIG. 2E, a picture display area in FIG. 2F displays a thumbnail of the picture 5 and does not display the thumbnail of the picture 2. In this way, the user can view the thumbnail of the picture 5.

In some embodiments, the user may view the thumbnail of the another picture of the video 1 in another manner. For example, in FIG. 2E, when the electronic device 100 detects an input operation (for example, sliding left) performed by the user on the picture display area, the electronic device 100 displays a user interface 25 shown in FIG. 2F.

Figure 2G:
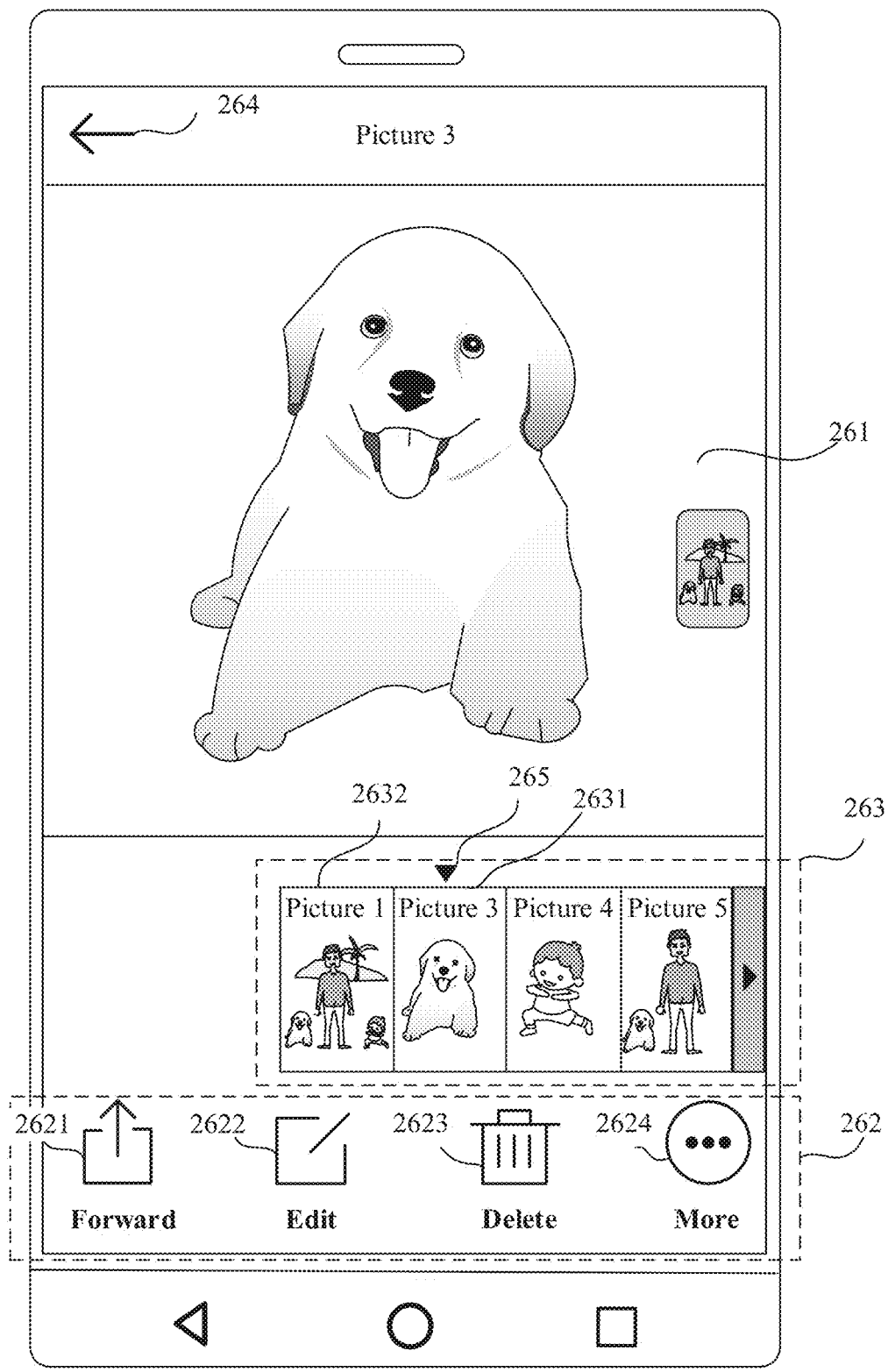

In FIG. 2F, when the electronic device 100 detects an input operation (for example, left sliding that causes the indicator icon 252 to be over a thumbnail 253 of the picture 2) performed on an indicator icon 252, the electronic device 100 displays a user interface 26 shown in FIG. 2G in response to the operation.

As shown in FIG. 2G, the user interface 26 is a picture display interface. The picture display interface includes a picture preview area 261, a function setting area 262, a picture display area 263, and a return control 264. The picture preview area 261 is configured to display the thumbnail of the picture 3 in FIG. 2F. At this time, an indicator icon 265 is located over the thumbnail 2631 of the picture 3. The function setting area 262 includes a share control 2621, an edit control 2622, a deletion control 2623, and a more control 2624. The share control 2621 is used for the user to share the picture 3. After the electronic device 100 detects a tapping operation performed on the share control 2621, the electronic device 100 forwards the picture 3 in response to the operation. The edit control 2622 is used for the user to edit the picture 3. After the electronic device 100 detects a tapping operation performed on the video edit control 2622, the electronic device 100 edits the picture 3 (for example, adjusts a brightness or a contrast of the picture 3). The deletion control 2623 is used for the user to delete the picture 3. After the electronic device 100 detects a tapping operation performed on the deletion control 2623, the electronic device 100 deletes the picture 3 in response to the operation. After the electronic device 100 detects a tapping operation performed on the return control 264, the electronic device 100 displays a user interface 27 shown in FIG. 2H in response to the operation.

Figure 2H:
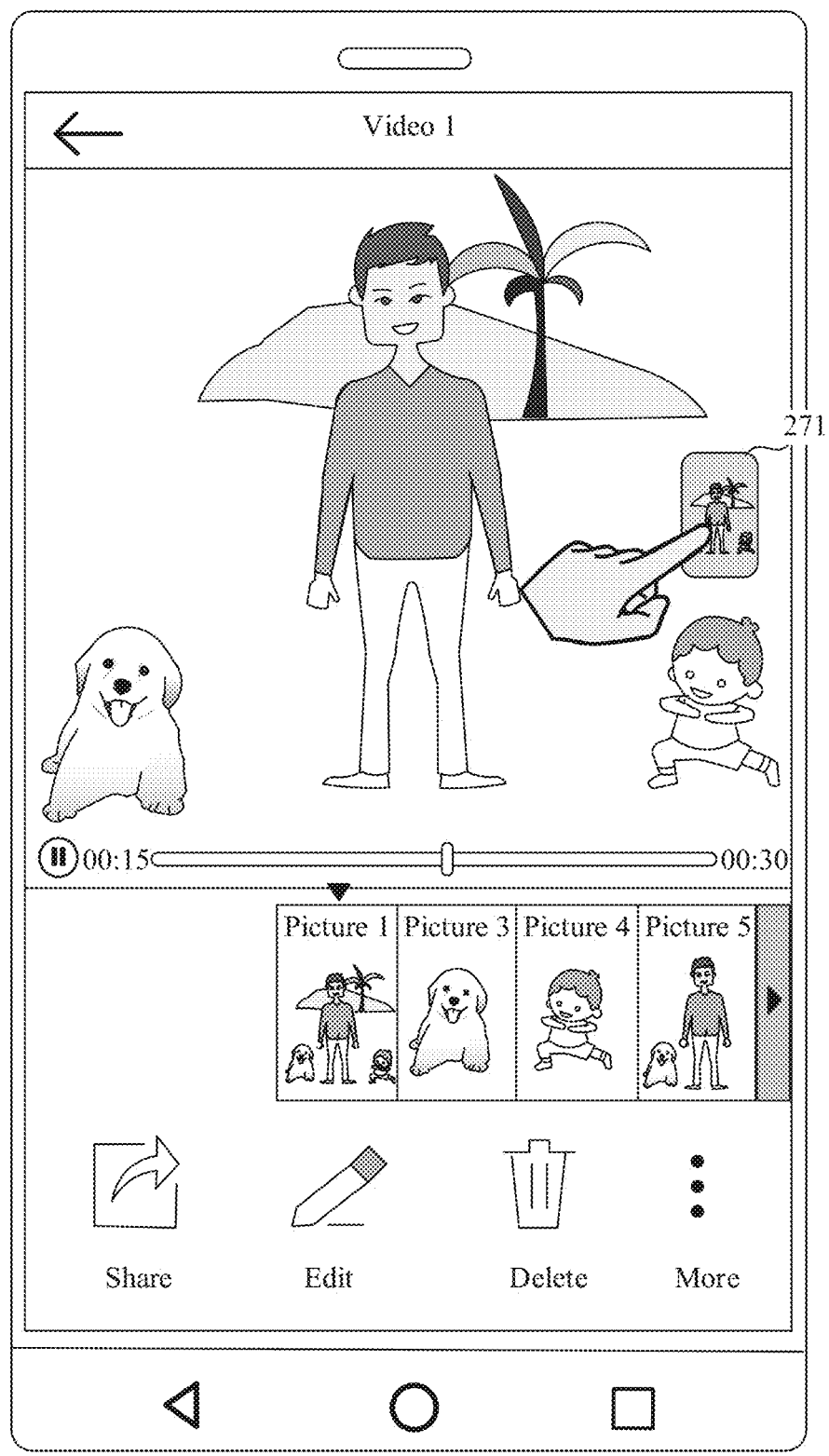

In a possible implementation, when the electronic device 100 detects an input operation performed on the indicator icon 265 (for example, the indicator icon is moved to be over the thumbnail of the picture 1), the electronic device 100 may also display the user interface 27 shown in FIG. 2H in response to the operation.

As shown in FIG. 2H, the user interface 27 is a video playback interface. The video playback interface is in a same state as the user interface 25 in FIG. 2F above. To be specific, the progress of the video 1 played on the user interface 27 is 15 seconds, and the progress of the video 1 the played on the user interface 27 is also 15 seconds. When the electronic device 100 detects a tapping operation performed on a video generation control 271, the electronic device 100 displays a user interface 28 shown in FIG. 2I in response to the operation.

Figure 2I:
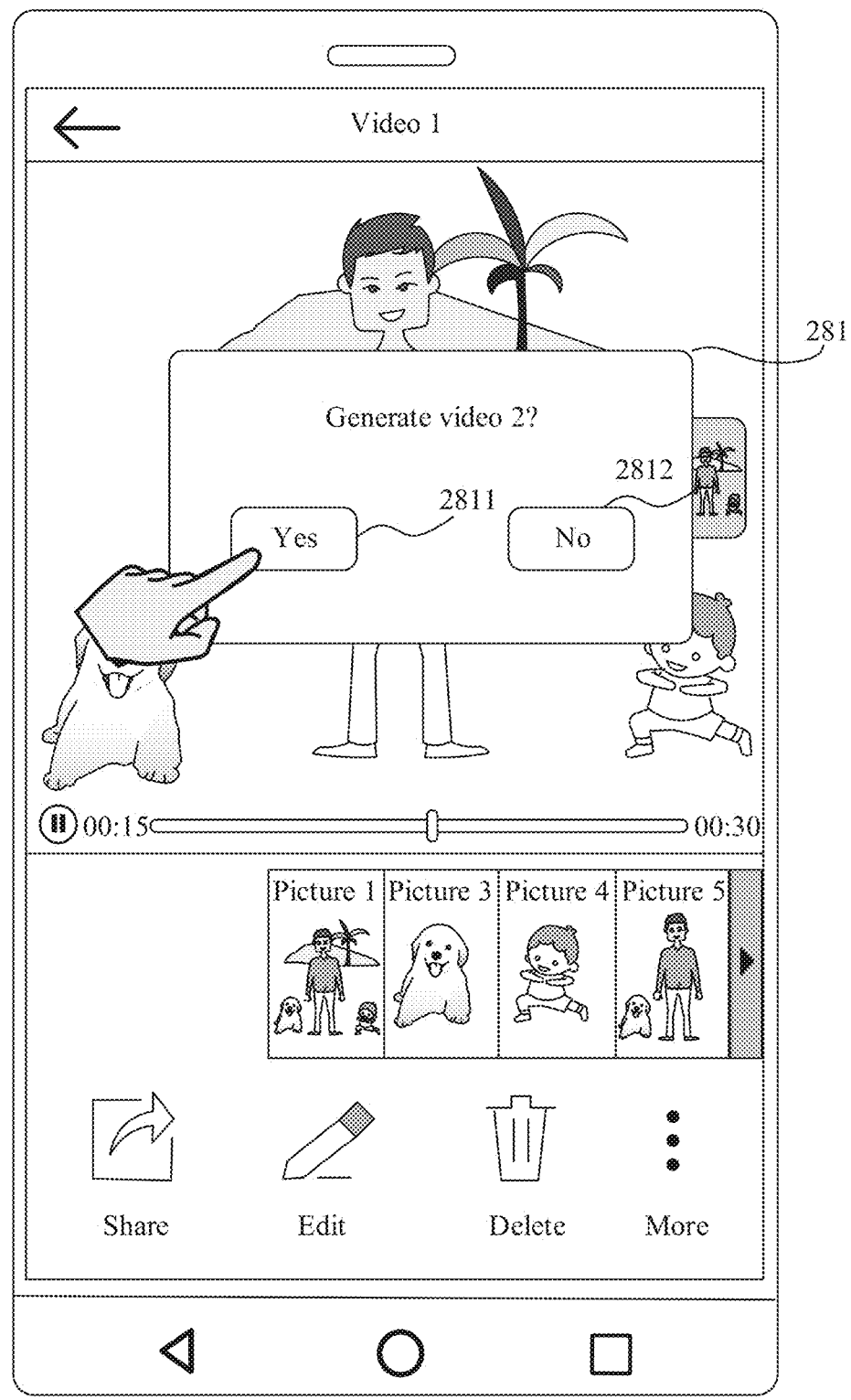

As shown in FIG. 2I, the user interface 28 is a video playback interface. The user interface 28 includes a first prompt box 281. The first prompt box 281 is used to prompt the user whether to generate a video 2. As shown in FIG. 2I, the first prompt box 281 displays a text message "Whether to generate a second video". The first prompt box 281 includes an acknowledgment control 2811 and a cancel control 2812. The acknowledgment control 2811 is configured to trigger the electronic device 100 to generate the video 2. When the electronic device 100 detects a tapping operation performed on the acknowledgment control 2811, the electronic device 100 displays a user interface 29 shown in FIG. 2J in response to the operation.

Figure 2J:
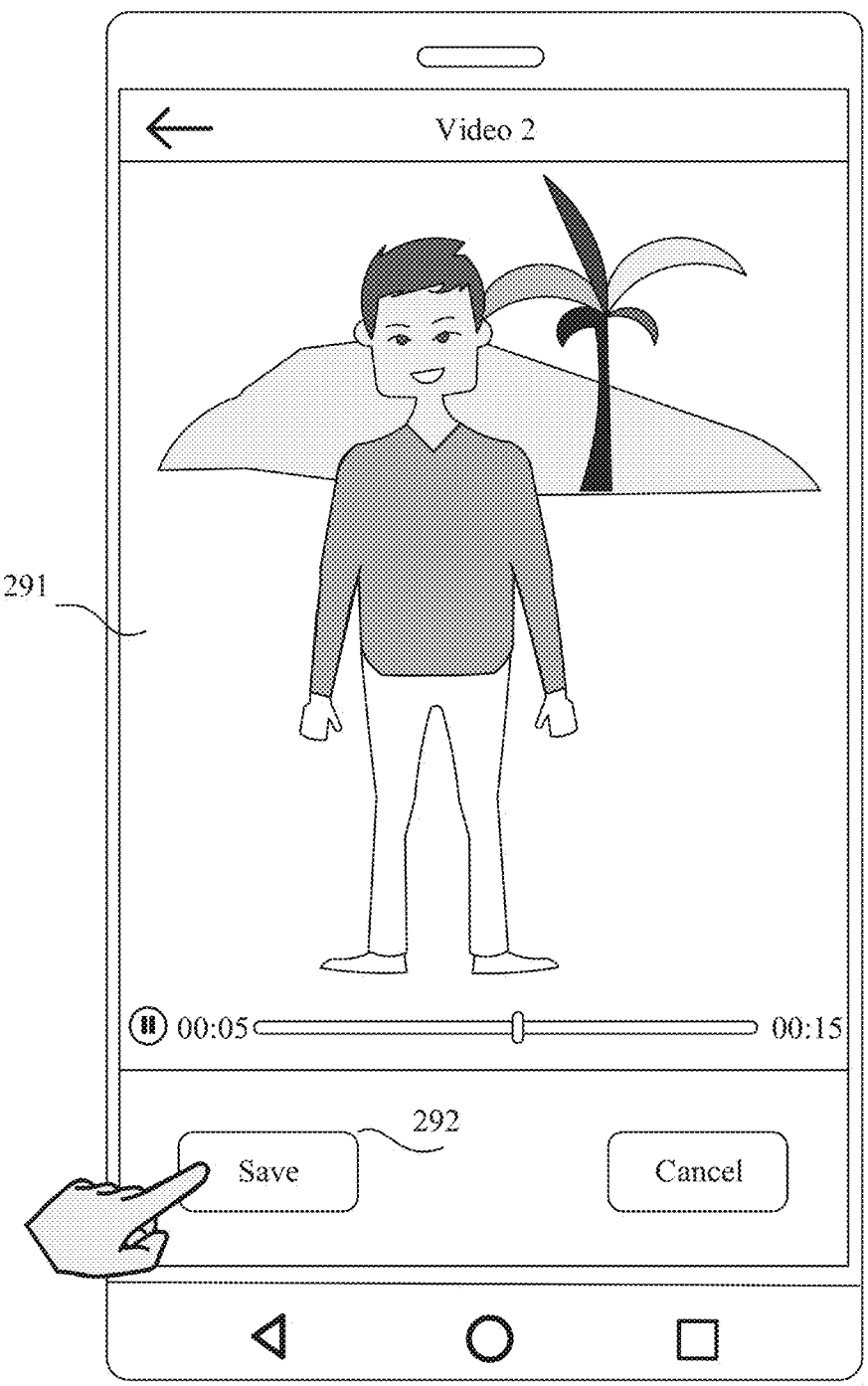

As shown in FIG. 2J, the user interface 29 is a video playback interface. The video playback interface includes a video preview area 291 and a storage control 292. The video preview area 291 is configured to display an image of the video 2. After the electronic device 100 detects a tapping operation performed on the storage control 292, the electronic device 100 saves the video 2 in response to the operation.

Figure 2K:
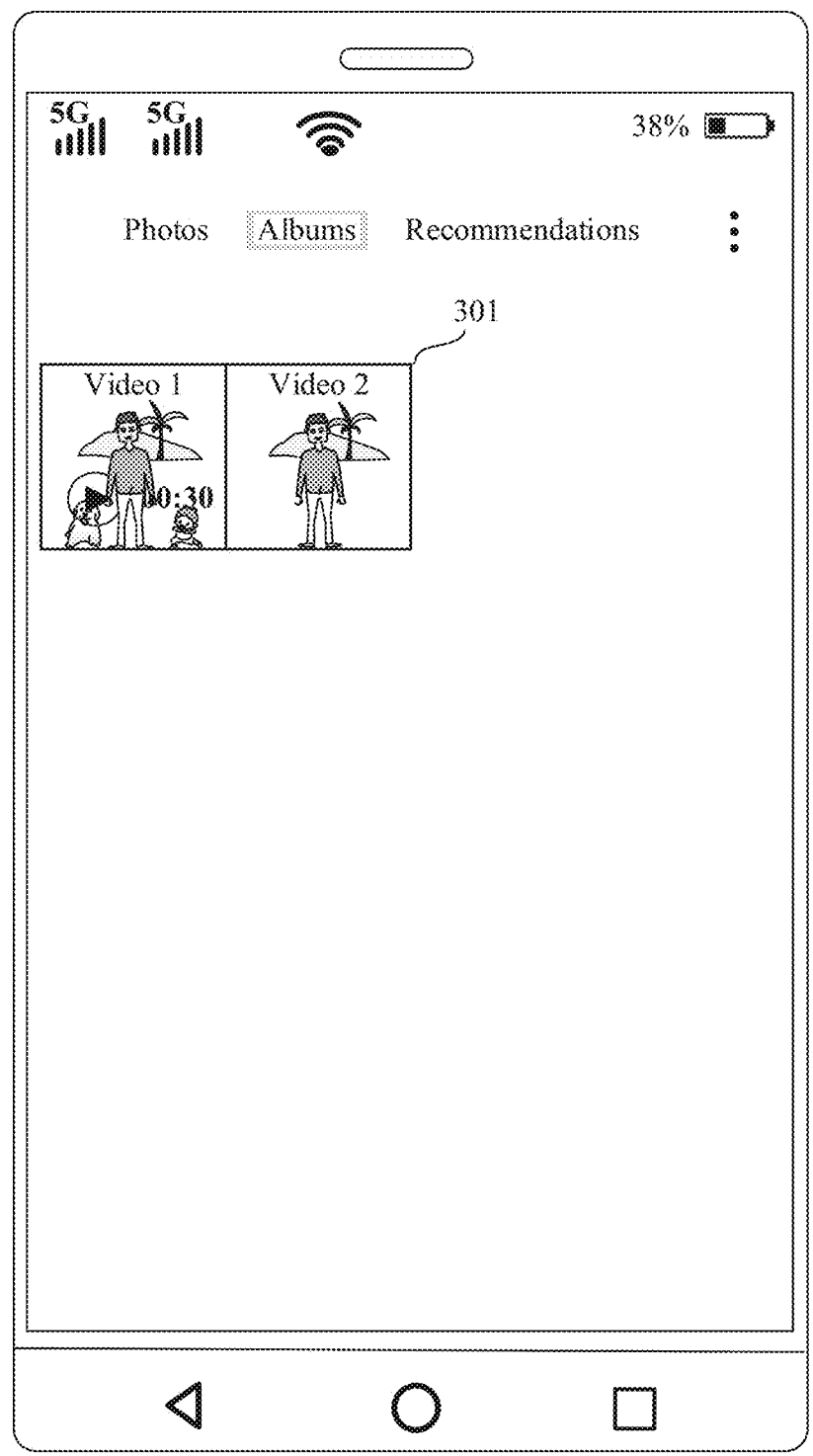

After the electronic device 100 saves the video 2, the user may search the gallery for the video 2 and browse the video. For example, after the electronic device 100 saves the video 2, the user may watch the video 2 in the video display interface. For example, as shown in FIG. 2K, a user interface 30 has an additional thumbnail 301 of the video 2 compared with the user interface 22. When electronic device 100 detects an input operation performed on the thumbnail 301, the electronic device 100 may play the video 2.

Figure 3:
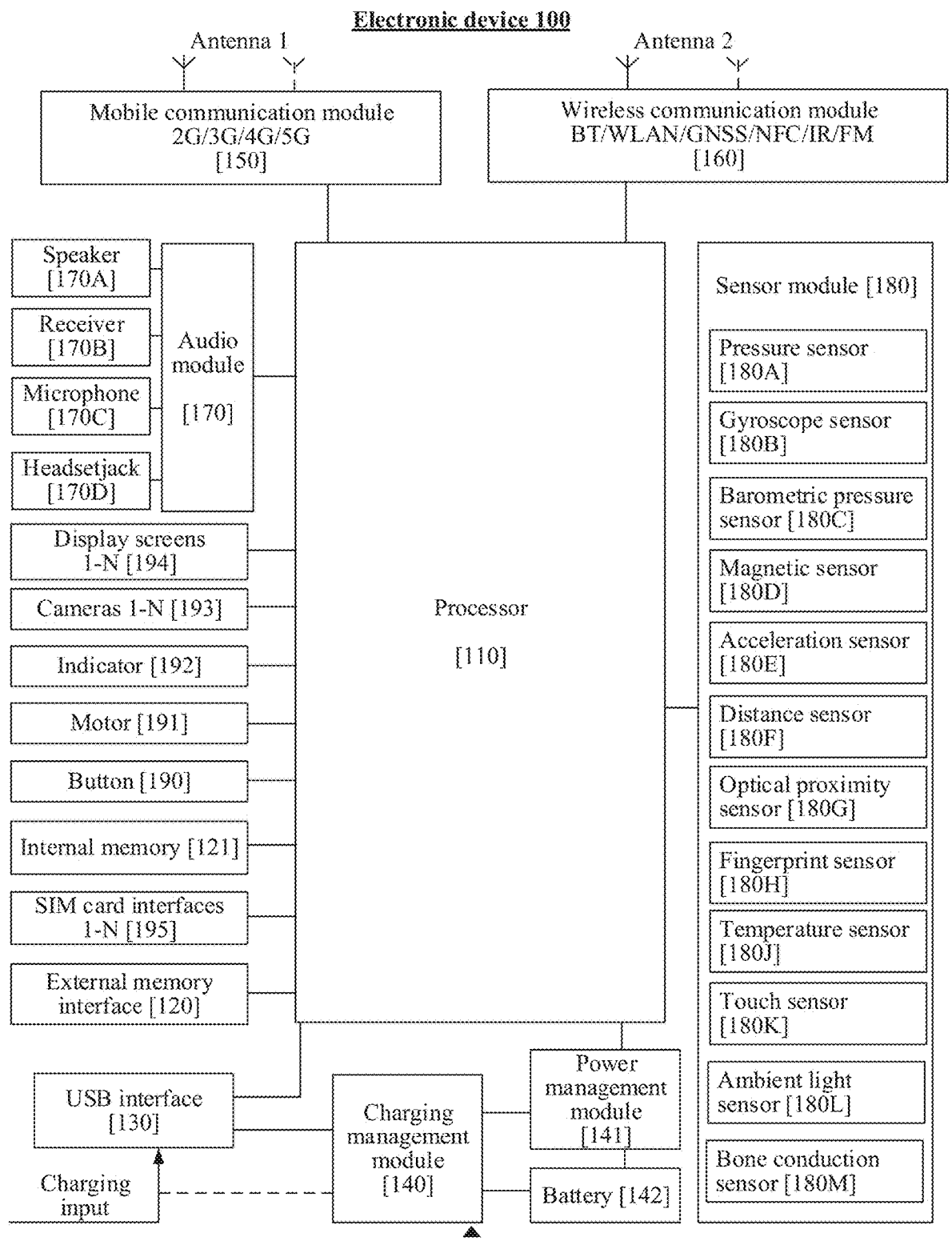
FIG. 3 is a schematic diagram of a hardware structure of an electronic device 100 according to an embodiment of this application.

A structure of the electronic device 100 is described below. Referring to FIG. 3, FIG. 3 is a schematic structural diagram of an electronic device 100 according to an embodiment of this application.

The electronic device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present disclosure does not constitute a specific limitation on the electronic device 100. In some other embodiments of this application, the electronic device 100 may include more or fewer components than those shown in the figure, or some components may be combined, or some components may be split, or different component arrangements may be used. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), and the like. Different processing units may be separate devices, or may be integrated into one or more processors.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device 100 may be used to cover one or more communication bands. Different antennas may be multiplexed to increase antenna utilization. For example, the antenna 1 may be multiplexed as a diversity antenna of a wireless local area network. In some other embodiments, the antennas may be used in combination with a tuning switch.

The mobile communication module 150 may provide a wireless communication solution including 2G/3G/4G/5G and the like applicable to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some functional modules of the mobile communication module 150 may be disposed in a same device as at least some modules of the processor 110.

The wireless communication module 160 may provide wireless communication solutions applicable to the electronic device 100, including a wireless local area network (WLAN) (for example, a Wi-Fi network), Bluetooth (BT), BLE broadcast, a global navigation satellite system (GNSS), frequency modulation (FM), a near field communication (NFC) technology, and an infrared (IR) technology. The wireless communication module 160 may be one or more devices into which at least one communication processing module is integrated. The wireless communication module 160 receives an electromagnetic wave by using the antenna 2, performs frequency modulation and filtering on the electromagnetic wave signal, and transmits a processed signal to the processor 110. The wireless communication module 160 may further receive a to-be-transmitted signal from the processor 110, perform frequency modulation and amplification on the to-be-transmitted signal, and convert the to-be-transmitted signal into an electromagnetic wave by using the antenna 2 for radiation.

The electronic device 100 implements a display function by using the GPU, the display screen 194, the application processor, and the like. The GPU is a microprocessor for picture processing and connects to the display screen 194 and the application processor. The GPU is configured to perform mathematical and geometric calculations and graphics rendering. The processor 110 may include one or more GPUs that execute a program instruction to generate or change display information.

The display screen 194 is configured to display a picture, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-OLED, a quantum dot light emitting diode (QLED), and the like. In some embodiments, the electronic device 100 may include 1 or N display screens 194. N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transmits the electrical signal to the ISP for processing, and therefore, the electrical signal is converted into a picture visible to a naked eye. The ISP may further perform algorithm optimization on a noise, a brightness, and a skin tone of the picture. The ISP may further optimize parameters such as an exposure and a color temperature of a to-be-photographed scene. In some embodiments, the ISP may be disposed in the camera 193.

The digital signal processor is configured to process a digital signal. In addition to processing a digital picture signal, the digital signal processor may further process another digital signal. For example, when the electronic device 100 performs frequency selection, the digital signal processor is configured to perform Fourier transform and the like on frequency energy.

The NPU is a neural-network (NN) computing processor, which quickly processes input information by referring to a structure of a biological neural network, for example, a transmission mode between neurons in a human brain, and may further continuously perform self-learning. Applications such as intelligent cognition of the electronic device 100, for example, picture recognition, facial recognition, voice recognition, and text understanding may be implemented by using the NPU.

The electronic device 100 may implement an audio function, for example, music playback and recording, by using the audio module 170, the loudspeaker 170A, the telephone receiver 170B, the microphone 170C, the headset jack 170D, the application processor, and the like.

The audio module 170 is configured to convert digital audio information into analog audio signal for output, and is further configured to convert an analog audio input into a digital audio signal. The audio module 170 may be further configured to encode and decode the audio signal. In some embodiments, the audio module 170 may be disposed in the processor 110, or some function modules in the audio module 170 are disposed in the processor 110.

The speaker 170A, also referred to as "horn", is configured to convert an electrical audio signal into a sound signal. The electronic device 100 may be used to listen to music or listen to a hands-free call through the speaker 170A.

The telephone receiver 170B, also referred to as "handset", is configured to convert an electrical audio signal into a sound signal. When the electronic device 100 is configured to answer a call or receive voice information, the phone receiver 170B may be put close to a human ear to receive a voice.

The microphone 170C, also referred to as "voice tube" or "mike", is configured to convert the sound signal into an electrical signal. When making a call or transmitting voice information, a user may make a sound by approaching the microphone 170C through the mouth of the user, to input a sound signal into the microphone 170C. At least one microphone 170C may be disposed in the electronic device 100. In some other embodiments, two microphones 170C may be disposed in the electronic device 100, to obtain a sound signal and implement a noise reduction function. In some other embodiments, three, four, or more microphones 170C may be disposed in the electronic device 100, to collect a sound signal and reduce noise. The microphones may further recognize a sound source, implement a directional recording function, and the like.

In some embodiments, the electronic device 100 may further include one or more of a button 190, a motor 191, an indicator 192, and an SIM card interface 195 (or an eSIM card interface). This is not limited in this embodiment of this application.

Figure 4:
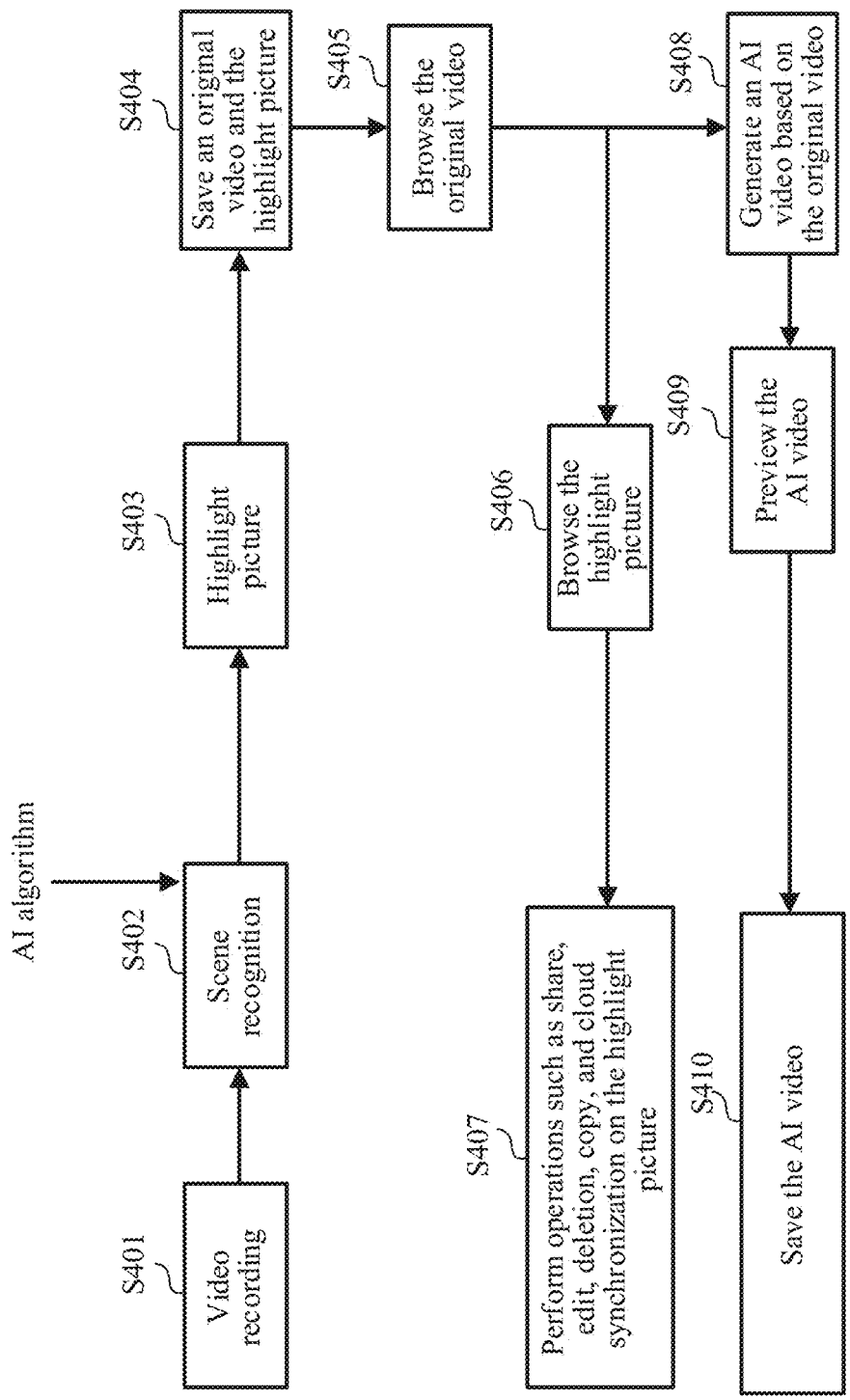
FIG. 4 is a framework flowchart of a picture display method according to an embodiment of this application.

The application scenario of the picture display method in embodiments of this application is described above with reference to FIG. 1A to FIG. 2K. A framework of a picture display method provided in an embodiment of this application is described below with reference to FIG. 4. Referring to FIG. 4, FIG. 4 is a framework flowchart of a picture display method according to an embodiment of this application. The framework is briefly described below.

An electronic device enables a video recording function of a camera APP and then records a video (step S401). During the video recording, the electronic device may recognize a current scene through an AI algorithm (step S402), so as to obtain one or more highlight pictures related to the video during the photographing (step S403). After the video recording is completed, the electronic device saves the recorded video and the highlight pictures corresponding to the video (step S404).

The electronic device may search a gallery APP for the recorded video and trigger the electronic device to enter a video playback interface, to browse the recorded video (step S405). In the video playback interface, thumbnails of the highlight pictures corresponding to the video are displayed (with an indicator control located over one of the thumbnails), and an AI video control is displayed. When the control is triggered, the electronic device may generate an AI video. During browsing of the recorded video, the user may browse any highlight picture by moving the indicator control (which may be the foregoing indicator icon 2331 in FIG. 2D) (step S406). At this time, the electronic device is switched from the video playback interface to a picture browsing interface, thereby displaying the highlight picture corresponding to the thumbnail indicated by the indicator control. In the picture browsing interface, the user may perform operations such as share, edit, deletion, copy, and cloud synchronization on the highlight picture (step S407).

In addition, the user may tap the AI video control in the video playback interface, so that the electronic device may generate an AI video based on the video (step S408). The AI video may be understood as a video that is generated by the electronic device based on the video and that automatically matches a template (for example, has special effects, music, and the like). After the electronic device generates the AI video, the electronic device may display the AI video in the preview interface (step S409). During previewing of the AI video, the user may edit the AI video (for example, cropping, or adding animation). The electronic device may save the AI video after tapping a storage control in the preview interface (step S410).

Figure 5:
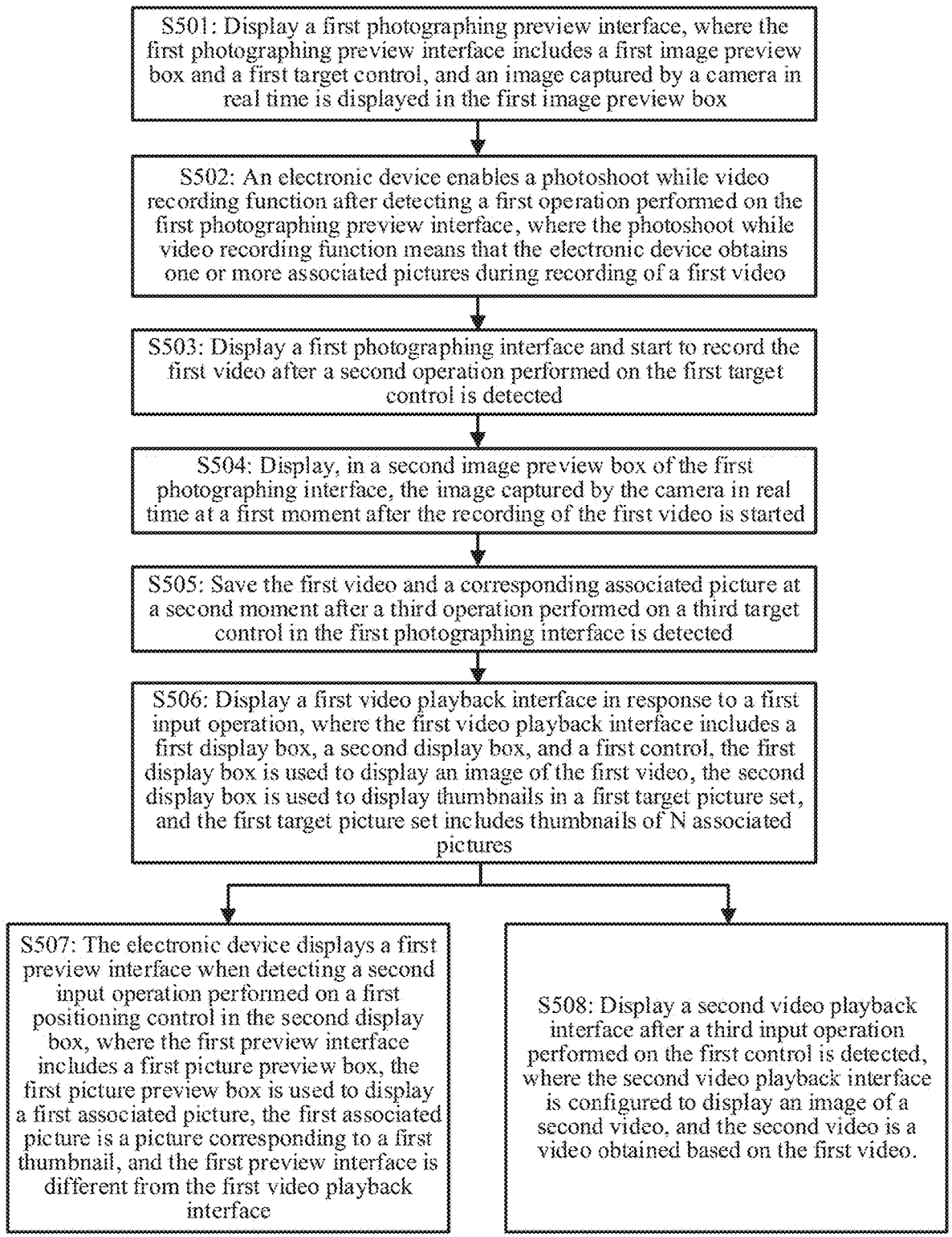
FIG. 5 is a flowchart of a picture display method according to an embodiment of this application.

A specific process of a picture display method provided in an embodiment of this application is described below with reference to FIG. 5. Referring to FIG. 5, FIG. 5 is a flowchart of a picture display method according to an embodiment of this application. The specific process is as follows.

Step S501: Display a first photographing preview interface, where the first photographing preview interface includes a first image preview box and a first target control, and an image captured by a camera in real time is displayed in the first preview box.

Specifically, the first photographing preview interface is a preview interface before the electronic device records a video. For example, the first photographing preview interface may be the foregoing user interface 11 shown in FIG. 1B. The first image preview box is used to display the image captured by the camera in real time, that is, a real-time image of a photographing environment. For example, the first image preview box may be the foregoing preview area 111 in FIG. 1B. The first control is used for a user to start the video recording on the electronic device. For example, the first target control may be the foregoing start control 116 in FIG. 1B.

Step S502: The electronic device enables a photoshoot while video recording function after detecting a first operation performed on the first photographing preview interface, where the photoshoot while video recording function means that the electronic device obtains one or more associated pictures during recording of a first video.

Specifically, the first photographing preview interface may include a second target control. The second target control is configured to trigger the electronic device to enable the "photoshoot while video recording" function. photoshoot while video recording means that the electronic device obtains one or more target pictures during the recording of the first video.

The associated pictures are pictures photographed during the recording of the first video, such as pictures manually photographed by the user during the recording of the first video, or may be pictures automatically photographed by the electronic devices during the recording of the first video. For example, the associated pictures of the first video may be highlight pictures of the first video, or may be pictures obtained after AI processing on the highlight pictures of the first video. For example, the AI processing may include operations such as recognizing a to-be-photographed scene and matching, for the highlight pictures, a filter adapting to the to-be-photographed scene.

The first operation may be a tapping operation performed by the user on the second target control. After the electronic device detects the first operation performed by the user on the second target control, the electronic device enables the photoshoot while video recording function in response to the first operation.

In some embodiments, the second target control may be a setting item in "Setting options", and the "photoshoot while video recording" function may be enabled by default when the electronic device records a video. When detecting the tapping operation performed on the second target control, the electronic device may disable the "photoshoot while video recording" function.

In some possible implementations, the first photographing preview interface may include a first setting control. For example, the first setting control may be the foregoing "more functions" control 119 in FIG. 1B. After the electronic device 100 detects a tapping operation performed on the first setting control, the electronic device displays a first function display box. The first function display box includes the second target control. The first function display box may be the foregoing "more functions" display area 131 in FIG. 1D, the second target control may be the foregoing "photoshoot while video recording" control 1312 in FIG. 1D, and the first operation may be the foregoing input operation (for example, tapping) performed on the "photoshoot while video recording" control 1312 in FIG. 1D.

Step S503: Display a first photographing interface and start to record the first video after a second operation performed on the first target control is detected.

Specifically, after detecting the second operation performed on the first target control, the electronic device displays the first photographing interface and starts to record the first video. The first photographing interface is different from the first photographing preview interface. The first photographing interface may include a second image preview box and a third target control. The second image preview box is used to display an image of a to-be-photographed object.

For example, the second operation may be the foregoing tapping operation performed on the start control in FIG. 1F, the first photographing interface may be the foregoing user interface 16 in FIG. 1H, the second image preview box may be the foregoing preview picture display area 161 in FIG. 1H, and the third target control may be the foregoing recording stop control 166 in FIG. 1H.

Step S504: Display, in a second image preview box of the first photographing interface, the image captured by the camera in real time at a first moment after the recording of the first video is started.

Step S505: Save the first video and a corresponding associated picture at a second moment after a third operation performed on a third target control in the first photographing interface is detected.

Specifically, the third operation may be the foregoing tapping operation performed on the recording stop control 166 in FIG. 1H. When the electronic device detects the third operation performed on the third target control, the electronic device stops recording the first video and saves the first video and the corresponding associated picture. The associated picture is a picture obtained by the electronic device during the recording of the first video. For example, the associated picture may be a highlight picture during the recording of the first video.

After the electronic device detects the third operation performed on the third target control, the camera generates a configuration file and a first identifier, and inserts the first identifier as meta information into the first video and a media file corresponding to the first video. The media file corresponding to the first video is generated after the electronic device detects the third operation performed on the third target control. The media file corresponding to the first video includes a thumbnail of the associated picture and the configuration file. The configuration file may be used for the electronic device to generate a second video based on the first video. The second video may be the foregoing AI video in the embodiment of FIG. 4.

For example, the first identifier may be a group ID. After the video recording is completed, the camera generates a group ID for the video and inserts the group ID into the video file. The group ID is used to identify a different video and has uniqueness among different electronic devices. For example, after recording of a video 1 is completed, the electronic device may generate a group ID 0010,0010 for the video 1 as a unique identifier of the video 1, and after recording of a video 2 is completed, the electronic device may generate a group ID 0020,0020 for the video 2 as a unique identifier of the video 2. A format of the group ID may be a binary string in a format of a universally unique identifier (UUID). In this embodiment of this application, that the first identifier is the group ID is used as an example for description.

The electronic device may write information such as a mapping relationship between the group ID and a storage path of the first video into a media file library. During the recording of the first video, if the electronic device enables the "photoshoot while video recording" function and detects the presence of the associated picture of the first video, the electronic device may write a mapping relationship among the group ID, the storage path of the associated picture, and the thumbnail of the associated picture into a media information library (for example, MediaLibrary). During the recording of the first video, if the electronic device detects the presence of the configuration file of the first video, the electronic device may generate a thumbnail of the second video. The electronic device may write a mapping relationship among the group ID, a storage path of the configuration file, and the thumbnail of the second video into the media information library (for example, MediaLibrary).

For example, Table 1 shows the mapping relationship between the video group ID and the storage path of the video file (that is, the recorded original video file). Table 2 shows the mapping relationship among the associated picture thumbnail, the group ID of the video, and the storage path of the associated picture. Table 3 shows the mapping relationship among the thumbnail of the second video, the storage path of the configuration file of the video, and the group ID of the video. Table 1, Table 2, and Table 3 are as follows:

TABLE 1

| Video | Group ID | Storage path |
|---|---|---|
| Video 1 | 001 | XXX/XXX/XXX |
| ... | ... | ... |

TABLE 2

| Picture | Group ID | Thumbnail | Storage path |
|---|---|---|---|
| Picture 1 | 001 | Thumbnail 1 | XXX/XXX/001 |
| Picture 2 | 001 | Thumbnail 2 | XXX/XXX/002 |
| Picture 3 | 001 | Thumbnail 3 | XXX/XXX/003 |
| Picture 4 | 001 | Thumbnail 4 | XXX/XXX/004 |
| Picture 5 | 001 | Thumbnail 5 | XXX/XXX/005 |
| ... | ... | ... | ... |

TABLE 3

| Thumbnail | Group ID | Storage path of configuration files |
|---|---|---|
| Thumbnail A | 001 | XXX/XXX/005 |
| ... | ... | ... |

The storage path is an address of the first video or the associated picture or the configuration file in a memory of the electronic device. The electronic device may find a storage location of the first video or the associated picture or the configuration file by reading the storage path. The electronic device may retrieve the first video, the configuration file, or the associated picture, so that the first video or the associated picture may be displayed on a screen of the electronic device. Alternatively, the electronic device may generate the second video based on the configuration file.

For example, if a storage path of a picture 1 is "Download/email/Video", it indicates that the picture 1 is stored in an email file under a Download folder of the electronic device and is in a Video file under the email file.

The configuration file is described below. The configuration file of the first video may be used for the electronic device to generate the second video. The configuration file is a video description file that includes video clipping information related to the first video. For example, the video clipping information may be time information used to instruct the electronic device to clip the first video. For example, a format of the video clipping information may be "30-32, 60-64, 100-115". The video clipping information indicates that a video clip from the $30^{th}$ second to the $32^{nd}$ second of the first video, a video clip from the $60^{th}$ second to the $64^{th}$ second, and a video clip from the $100^{th}$ second to $115^{th}$ second need to be clipped. The three video clips may be synthesized and processed to obtain a second video with a duration of 21 seconds.

Optionally, the configuration file may further include dynamic effect processing information. The dynamic effect processing information is used to instruct the electronic device to perform operations on the second video, for example, configure dynamic effects. For example, that the electronic device configures the dynamic effects for the second video may be that the electronic device adds dynamic scenes (such as rain scenes) to the second video. In this case, the rain scene is displayed during the playback of the second video.

Step S506: Display a first video playback interface in response to a first input operation, where the first video playback interface includes a first display box, a second display box, and a first control, the first display box is used to display an image of the first video, the second display box is used to display thumbnails in a first target picture set, and the first target picture set includes thumbnails of N associated pictures.

Specifically, the first input operation may be the foregoing input operation performed on the thumbnail 221 in FIG. 2D, the first video playback interface may be the foregoing video playback interface of the gallery APP in FIG. 2D, the first display box may be the foregoing video display area 231 in FIG. 2D, the second display box may be the foregoing picture display area 233 in FIG. 2D, and the first control may be the foregoing video generation control 235 in FIG. 2D. The first target picture set is a collection of all associated pictures.

Figure 6:
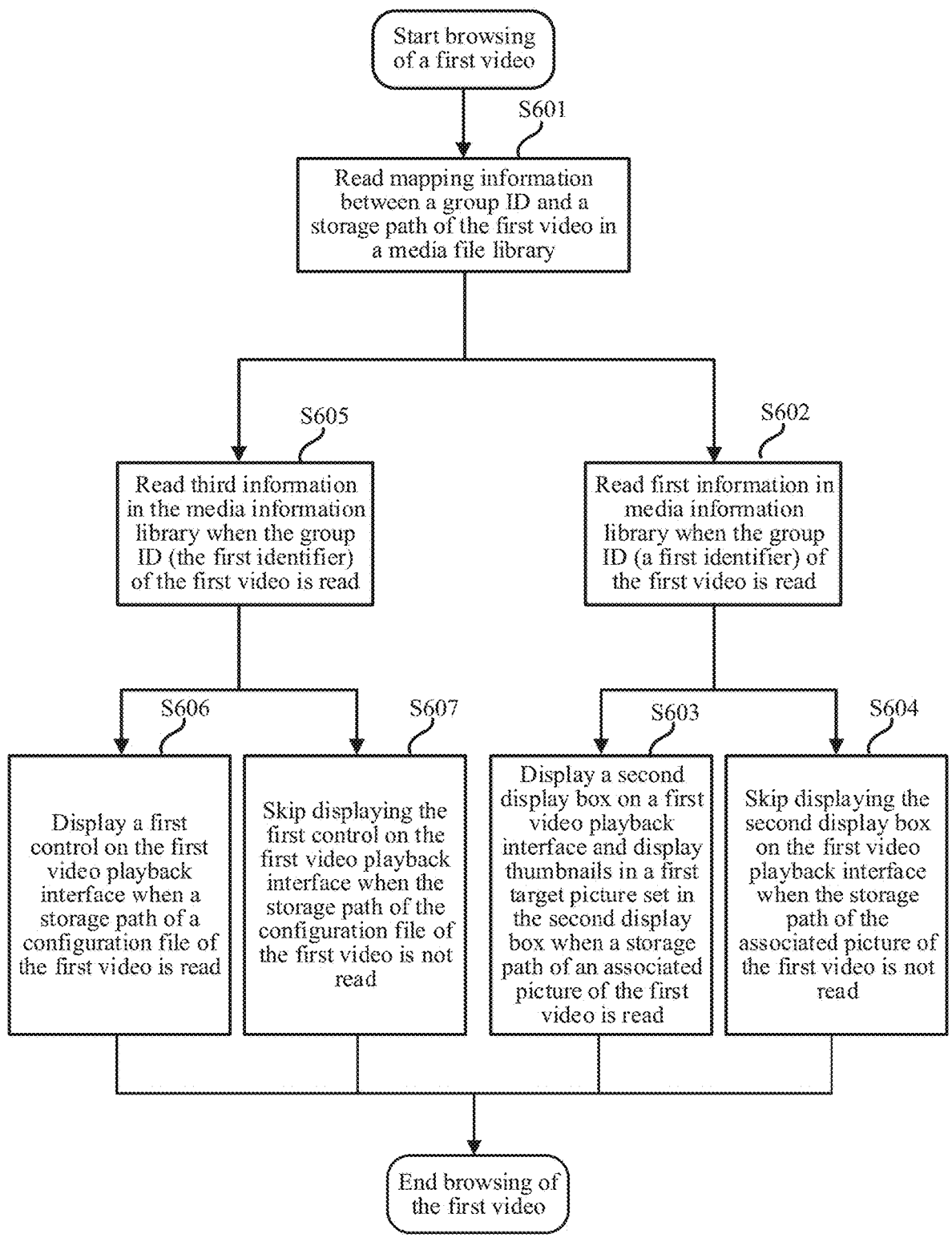
FIG. 6 is a flowchart of displaying a second display box and a first control according to an embodiment of this application.

A specific process in which the electronic device displays the second display box and the first control on the first video playback interface is described below with reference to FIG. 6. Referring to FIG. 6, FIG. 6 is a flowchart of displaying the second display box and the first control according to an embodiment of this application. The specific process is as follows.

Step S601: The electronic device reads the mapping information between the group ID and the storage path of the first video in the media file library.

Specifically, the mapping information is used to represent the mapping relationship between the first video and the corresponding group ID. For example, the mapping information between the group ID and the storage path of the first video may be found in Table 1 in step S505. As described in step S505, after the recording of the first video is completed, the camera generates the group ID for the first video and inserts the group ID into the first video file. Then, the electronic device writes the mapping relationship between the group ID and the storage path of the first video file into the media file library.

After detecting the first input operation, the electronic device reads second information in the media file library to obtain the group ID of the first video.

Step S602: The electronic device reads first information in a media information library when reading the group ID (the first identifier) of the first video.

Specifically, the second information may be the mapping relationship between the thumbnail of the associated picture of the first video, the group ID of the first video, and the storage path of the associated picture of the first video. The mapping relationship is shown in Table 2 in step S505.

Step S603: The electronic device displays the second display box on the first video playback interface and displays the thumbnails in the first target picture set in the second display box when reading the storage path of the associated picture of the first video.

Specifically, when the electronic device reads the storage path of the associated picture of the first video in the media information library based on the group ID of the first video, the electronic device may determine that the first video has the associated picture. The electronic device displays the second display box on the first video playback interface and displays the thumbnails in the first target picture set in the second display box.

A maximum number of thumbnails displayed in the second target display box is M, a number of the thumbnails in the first target picture set is N, and the displaying of the thumbnails in the first target picture set in the second display box may have the following two cases.

In a first case, when N is greater than or equal to M, the second display box displays M thumbnails in the first target picture set. For example, as shown in FIG. 2D, if it is assumed that the first video has 5 associated pictures, since the picture display area can display only up to 4 thumbnails, only the thumbnails of the picture 1 to the picture 4 are displayed in the picture display area.

In a second case, when N is less than M, the second display box displays all the thumbnails in the first target picture set. For example, if the first video has only 3 associated pictures, and the second display box can display up to 4 thumbnails, the thumbnails of the 3 associated pictures can be displayed in the second display box.

Step S604: The electronic device skips displaying the second display box on the first video playback interface when failing in reading the storage path of the associated picture of the first video.

Specifically, when the electronic device fails in reading the storage path of the associated picture of the first video in the media information library based on the group ID of the first video, the electronic device may determine that the first video has no associated picture. In this case, the electronic device does not display the second display box on the first video playback interface.

Figure 7A:
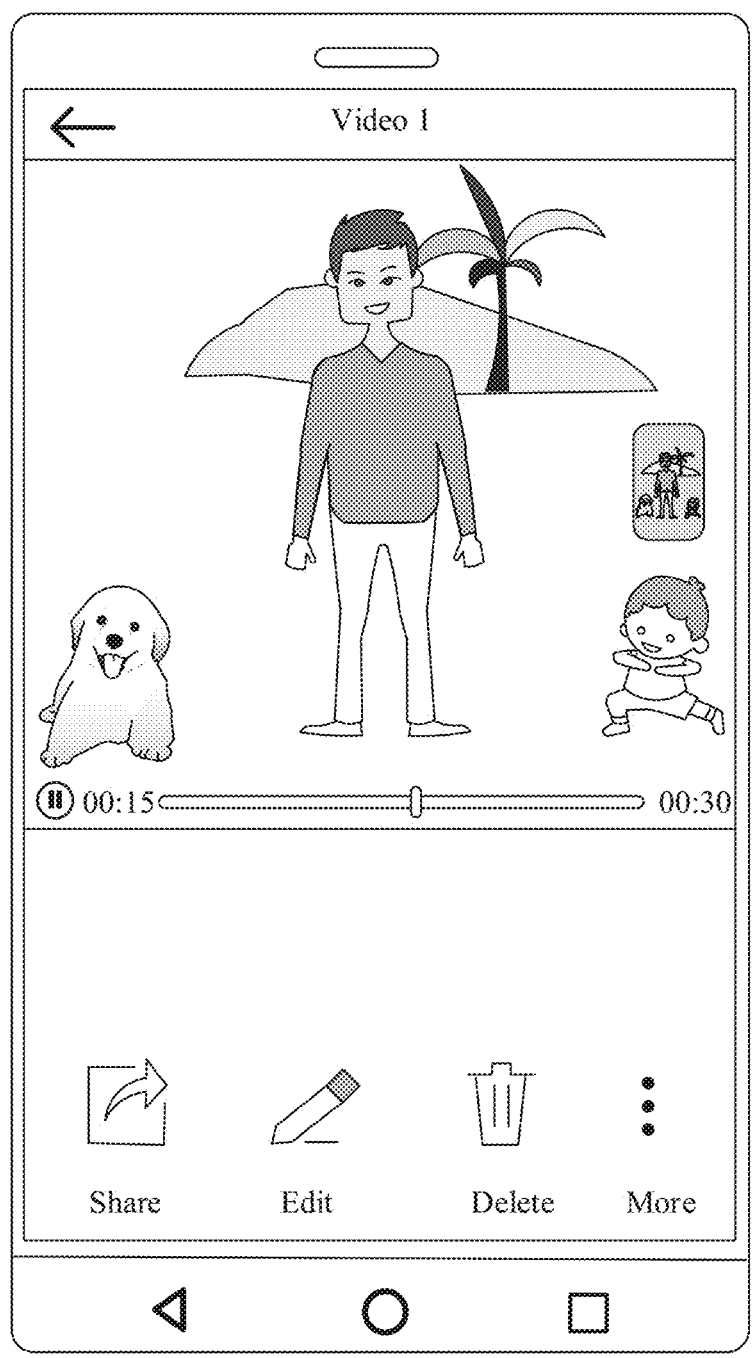
FIG. 7A is a diagram of a first video playback interface when a storage path of associated pictures of a first video is not read according to an embodiment of this application.

For example, as shown in FIG. 7A, FIG. 7A is a schematic diagram of the first video playback interface when the storage path of the associated picture of the first video is not read. It may be learned from 7A that compared with the foregoing user interface 23 in FIG. 2D, the user interface 70 in FIG. 7A does not display the picture display area 233.

Step S605: The electronic device reads third information in the media information library when reading the group ID (the first identifier) of the first video.

Specifically, the third information may be the mapping relationship among the storage path of the configuration file of the first video, the group ID of the first video, and the thumbnail of the second video. The third information may be shown in Table 3 of step S505 in the foregoing embodiment of FIG. 5.

Step S606: The electronic device displays the first control on the first video playback interface when reading the storage path of the configuration file of the first video.

Specifically, when the electronic device reads the storage path of the configuration file of the first video, the electronic device determines that the first video has a configuration file, and therefore may generate the second video based on the configuration file. Therefore, the electronic device may display the first control on the first video playback interface. The first control can display the thumbnail of the second video. The thumbnail of the second video may be obtained based on the configuration file of the first video.

For example, after the recording of the first video is completed, if the configuration file is used to indicate that the generated second video includes the content of the video clip from the $30^{th}$ second to the $32^{nd}$ second in the first video, the electronic device may obtain any frame of picture from the video clip from the $30^{th}$ second to the $32^{nd}$ second in the first video, use the frame of picture as a cover of the second video, generate a thumbnail of the frame of picture, and store the thumbnail of the frame of picture in the media information library. When the electronic device is to display the first control on the first video playback interface, the electronic device calls the thumbnail from the media information library and displays the thumbnail on the first control.

In a possible implementation, the thumbnail of the second video may be replaced with a thumbnail of any associated picture or a thumbnail of any picture in an album of the electronic device. A source of the thumbnail of the second video is not limited in this embodiment of this application.

Step S607: The electronic device skips displaying the first control on the first video playback interface when failing in reading the storage path of the configuration file of the first video.

Specifically, when the electronic device fails in reading the storage path of the configuration file of the first video, the electronic device determines that the first video has no configuration file. Therefore, the electronic device does not have the function of generating the second video based on the configuration file, and the electronic device does not display the first control on the first video playback interface.

Figure 7B:
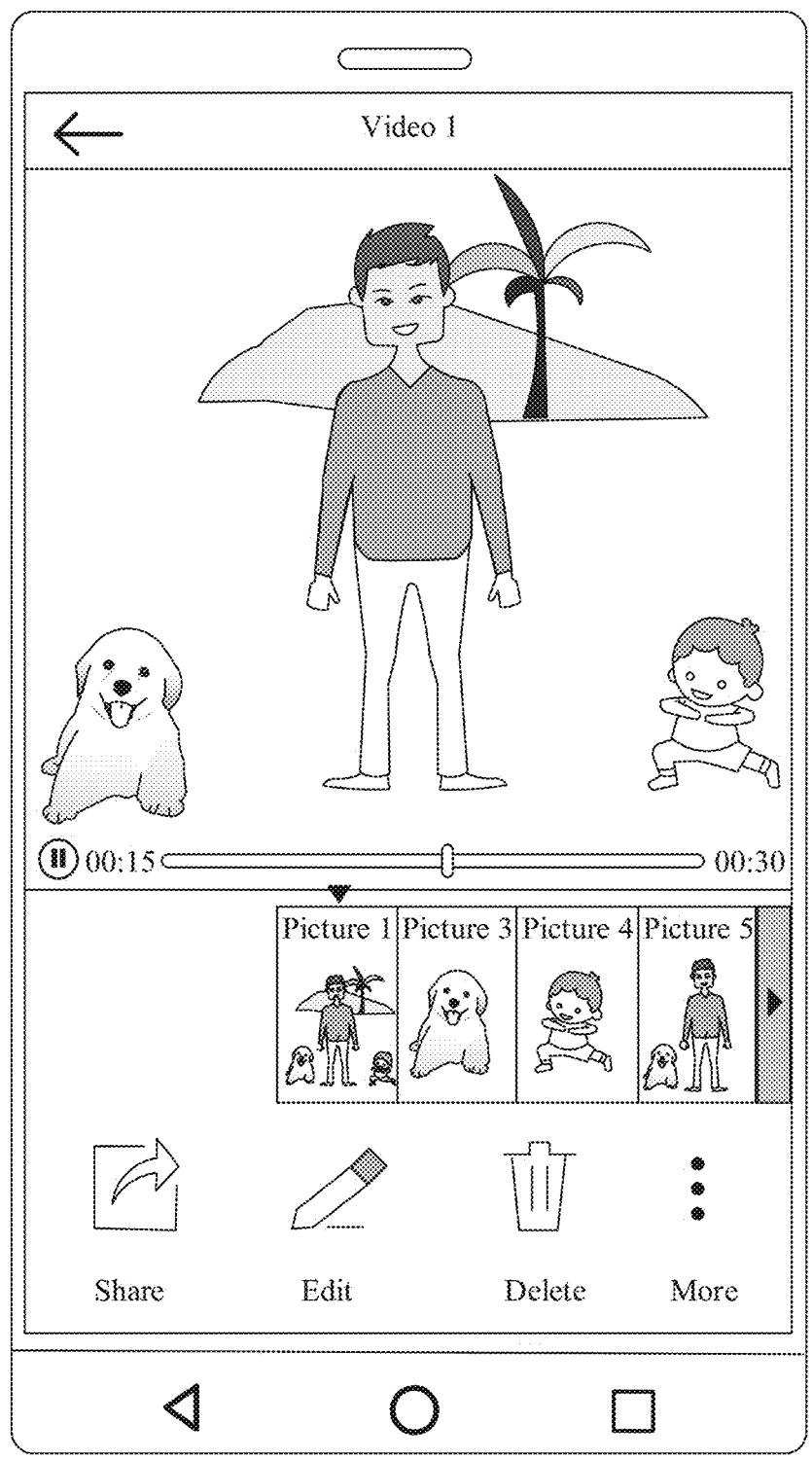
FIG. 7B is a diagram of a first video playback interface when a storage path of a configuration file of the first video is not read according to an embodiment of this application.

For example, as shown in FIG. 7B, FIG. 7B is a schematic diagram of the first video playback interface when the storage path of the configuration file of the first video is not read. As shown in FIG. 7B, compared with the user interface 23 in FIG. 2D, a user interface 71 in FIG. 7B does not display the video generation control 235.

The specific process in which the electronic device displays the first control and the second display box on the first video playback interface after making the response to the first input operation are describe above through step S601 to step S607.

It is to be understood that step S506 is described by using that the electronic device detects the presence of the first identifier in the first video, the configuration file of the first video, and the associated picture as an example. It may be understood that after the electronic device makes the response to the first input operation, the electronic device may further display the first control and the second display box on the first video playback interface.

Optionally, when the number N of the associated pictures is greater than M, after the electronic device detects a fourth input operation performed on the second display box, the electronic device switches the thumbnail on the second display box in response to the fourth input operation.

For example, the fourth input operation may be the foregoing tapping operation performed on the sliding control 243 in FIG. 2E. Before the response to the fourth input operation, the thumbnail displayed in the second display box may include the foregoing thumbnails of the picture 1 to the picture 4 in the picture display area in FIG. 2F. After the response to the fourth input operation, the thumbnail displayed in the second display box may include the foregoing thumbnails of the picture 1 and the picture 3 to the picture 5 in the picture display area in FIG. 2G.

Step S507: The electronic device displays a first preview interface when detecting a second input operation performed on a first positioning control in the second display box, where the first preview interface includes a first picture preview box, the first picture preview box is used to display a first associated picture, the first associated picture is a picture corresponding to a first thumbnail, and the first preview interface is different from the first video playback interface.

Specifically, the first preview interface is used to display the associated picture corresponding to the first thumbnail. For example, the first thumbnail may be the foregoing thumbnail 253 in FIG. 2F, the second input operation may be the foregoing input operation performed on the indicator icon 252 in FIG. 2F (for example, left sliding that causes the indicator icon 252 to be over the thumbnail 253 of the picture 2), the first preview interface may be the foregoing picture display interface in FIG. 2G, the first picture preview box may be the foregoing picture preview area 261 in FIG. 2G, and the first positioning control may be the foregoing indicator icon 252 in FIG. 2F.

After the electronic device detects the second input operation performed on the first positioning control, the electronic device retrieves a file of the associated picture in a corresponding folder based on a storage path of the associated picture corresponding to the first thumbnail, and displays the associated picture on the first preview interface.

Optionally, the first preview interface may further include the first thumbnail. For example, the first thumbnail may be the foregoing thumbnail 2632 of the picture 1 in FIG. 2G. When the electronic device detects a third input operation performed on the first positioning control, the electronic device displays the first video playback interface. At this time, a state of the first video playback interface may be the same as a state before switching to the first preview interface. The state of the first video playback interface includes a playback progress of the first video. For example, the third input operation may be the foregoing input operation performed on the indicator icon 265 in FIG. 2G (for example, the indicator icon is moved to be over the thumbnail 2632 of the picture 1).

Optionally, the first preview interface may further include a fourth control. For example, the fourth control may be the foregoing return control 264 in FIG. 2G. When the electronic device detects an input operation (for example, tapping) performed on the fourth control, the electronic device may switch back to the first video playback interface from the first preview interface. At this time, a state of the first video playback interface may be the same as a state before switching to the first preview interface. The state of the first video playback interface includes a playback progress of the first video.

Step S508: Display a second video playback interface after a third input operation performed on the first control is detected, where the second video playback interface is configured to display an image of a second video, and the second video is a video obtained based on the first video.

Specifically, the second video playback interface is an interface for playing the second video, and the second video is a video generated by the electronic device based on the first video and the configuration file. For example, the third input operation may be the foregoing tapping operation performed on the video generation control 271 in FIG. 2H, and the second video playback interface may be the foregoing video playback interface in FIG. 2J.

After the electronic device detects the third input operation performed on the first control, the electronic device may read the configuration file of the first video from the memory of the electronic device based on the storage path of the configuration file, generate the second video based on the first video and the corresponding configuration file, and display the second video on the second video playback interface. The second video playback interface includes a first video preview box. The first video preview box is configured to display the image of the second video. For example, the first video preview box may be the foregoing video preview area 291 in FIG. 2J.

Optionally, the second video playback interface includes a third control. When the electronic device detects a fifth input operation performed on the third control, the electronic device saves the second video. For example, the third control may be foregoing storage control 292 in FIG. 2J, and the fifth input operation may be the foregoing tapping operation performed on the storage control 292 in FIG. 2J.

In this embodiment of this application, the video and the associated pictures of the video are displayed on the same user interface, so that the user may switch from the video playback interface to the picture preview interface by tapping the thumbnails of the associated pictures of the video on the video playback interface during browsing or playback of the video, thereby browsing the pictures corresponding to the thumbnails. In this way, the user may quickly browse the relevant pictures of the video while watching the video, without a need to perform cumbersome operations such as "exiting video playback-entering the gallery-searching for the associated pictures-browsing the pictures", which greatly saves time for the user and improves user experience. In addition, during browsing of the pictures, the electronic device may be switched back to the video playback interface from the picture preview interface through tapping of a Back button or the return control on the electronic device, so that the progress of the video played in the video playback interface after switching is the same as that in the video playback interface before switching to the picture preview interface, thereby avoiding a time waste of the user and degrading of user experience as a result of the electronic device replaying the video and causing the user to seek for the original playback progress after switching back to the video playback interface.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, some or all processes or functions according to this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server or data center to another network site, computer, server or data center in a wired (such as a coaxial cable, an optical fiber, or a digital subscriber line) or wireless (such as infrared, wireless, or microwave) manner. The computer-readable storage medium may be any usable medium that may be accessed by the computer, or a data storage device such as a server or a data center in which one or more usable mediums are integrated. The usable medium may be a magnetic medium (for example, a floppy disk, a hard disk, or a magnetic tape), an optical medium (for example, a DVD), a semiconductor medium (for example, a solid-state drive or solid-state disk), or the like.

A person of ordinary skill in the art may understand that all or some of the processes of the methods in the foregoing embodiments may be implemented by a computer program instructing related hardware. The program may be stored in a computer-readable storage medium. When the program is executed, the processes in the foregoing method embodiments may be included. The storage medium includes any medium that can store program code, for example, a read-only memory (ROM), a random access memory (RAM), a magnetic disk, or an optical disc.

To sum up, the foregoing descriptions are merely embodiments of the technical solutions of the present disclosure, and are not intended to limit the protection scope of the present disclosure. Any modification, equivalent replacement, improvement, and the like made based on the disclosure of the present disclosure shall fall within the protection scope of the present disclosure.

What is claimed is:

1. A picture display method, the method comprising:
    starting, by an electronic device, a gallery application;
    displaying, by the electronic device, a first interface of the gallery application, wherein the first interface comprises a first thumbnail, and the first thumbnail is a thumbnail corresponding to a first video;
    detecting, by the electronic device, a first input operation on the first thumbnail;
    obtaining, by the electronic device, based on a group identifier (ID) of the first video, thumbnails of N associated pictures associated with the first video, wherein the N associated pictures are concurrently captured pictures from the first video in a recording process of the first video, the group ID is used to identify the first video, and N is an integer greater than 1;
    displaying, by the electronic device based on detecting the first input operation, a video playback interface adapted for displaying video images, wherein the video playback interface includes a first display box and a second display box, wherein the first display box is used to display an image of the first video, and the second display box is used to display the thumbnails of the N associated pictures, wherein the second display box is spatially distinct from and does not overlap the first display box in the video playback interface;
    detecting, by the electronic device, a second input operation on a first positioning control, wherein the first positioning control indicates a first target thumbnail, and the first target thumbnail is a thumbnail of the N associated pictures displayed in the second display box;
    obtaining, by the electronic device, a storage path of a first associated picture from second information based on the first target thumbnail, wherein the second information is information in a media information library, the second information comprises a mapping relationship among the group ID of the first video, a storage path of the N associated pictures, and the thumbnails of the N associated pictures, and the first target thumbnail is a thumbnail of the first associated picture;
    retrieving, by the electronic device, the first associated picture based on the storage path of the first associated picture; and
    displaying, by the electronic device based on detecting the second input operation, a picture playback interface adapted for displaying still images, wherein the picture playback interface includes a first picture preview box and the second display box, wherein the first picture preview box is used to display the first associated picture, the first positioning control indicates the first target thumbnail, the first target thumbnail is the thumbnail in the second display box, and the first target thumbnail is the thumbnail of the first associated picture, wherein the second display box is spatially distinct from and does not overlap the first picture preview box in the picture playback interface.

2. The method according to claim 1, wherein after the detecting the first input operation on the first thumbnail and before the obtaining, based on the group ID of the first video, the thumbnails of the N associated pictures associated with the first video, the method further comprises:
    reading first information in a media file library, wherein the first information comprises a mapping relationship between a storage path of the first video and the group ID of the first video; and
    obtaining the group ID of the first video based on the first information.

3. The method according to claim 1, wherein the obtaining, based on the group ID of the first video, the thumbnails of the N associated pictures associated with the first video comprises:
    reading the second information in the media information library based on the group ID of the first video; and
    obtaining the thumbnails of the N associated pictures associated with the first video when the storage path of the N associated pictures is read.

4. The method according to claim 1, wherein the video playback interface further comprises a first control, the first control is a control displayed when a configuration file exists, the first control is configured to trigger generation of a second video, and the second video is different from the first video.

5. The method according to claim 4, wherein after the displaying the video playback interface of the first video, the method further comprises:
    detecting a third input operation on the first control;
    reading third information based on the group ID of the first video, wherein the third information comprises a mapping relationship between a storage path of a configuration file of the first video and the group ID;
    retrieving the configuration file of the first video based on the storage path of the configuration file of the first video;
    processing the first video based on the configuration file of the first video to obtain the second video; and displaying a second video playback interface, wherein the second video playback interface is different from the video playback interface, and the first display box in the second video playback interface is used to display an image of the second video.

6. The method according to claim 1, wherein the second display box comprises a second target thumbnail, and after the displaying the picture playback interface, the method further comprises:
   detecting an input operation on the second target thumbnail; and
   displaying the video playback interface of the first video.

7. The method according to claim 1, wherein a maximum number of the thumbnails of the N associated pictures displayed in the second display box is M, the second display box comprises a first switching control, and after the displaying the video playback interface of the first video, the method further comprises:
   detecting an input operation on the first switching control when N is greater than M; and
   switching the thumbnails in the second display box, wherein the thumbnail displayed in the second display box before switching is different from the thumbnail displayed in the second display box after switching.

8. The method according to claim 1, wherein the first associated picture is an image file.

9. The method according to claim 1, wherein the video playback interface includes a playback progress of the first video, and after the displaying the picture playback interface, and the method further comprises:
   switching, by the electronic device, from the picture playback interface directly back to the video playback interface at the playback progress of the first video.

10. An electronic device, comprising:
   a memory;
   a processor; and
   a touch screen;
   wherein the touch screen is configured to display content;
   wherein the memory is configured to store a computer program, and the computer program comprises computer instructions; and
   wherein the processor is configured to execute the computer instructions, so that the electronic device performs operations comprising:
      starting a gallery application;
      displaying a first interface of the gallery application, wherein the first interface comprises a first thumbnail, and the first thumbnail is a thumbnail corresponding to a first video;
      detecting a first input operation on the first thumbnail;
      obtaining, based on a group identifier (ID) of the first video, thumbnails of N associated pictures associated with the first video, wherein the N associated pictures are concurrently captured pictures from the first video in a recording process of the first video, the group ID is used to identify the first video, and N is an integer greater than 1;
      displaying, based on detecting the first input operation, a video playback interface adapted for displaying video images, wherein the video playback interface includes a first display box and a second display box, wherein the first display box is used to display an image of the first video, and the second display box is used to display the thumbnails of the N associated pictures, wherein the second display box is spatially distinct from and does not overlap the first display box in the video playback interface;
      detecting a second input operation on a first positioning control, wherein the first positioning control indicates a first target thumbnail, and the first target thumbnail is a thumbnail of the N associated pictures displayed in the second display box;
      obtaining a storage path of a first associated picture from second information based on the first target thumbnail, wherein the second information is information in a media information library, the second information comprises a mapping relationship among the group ID of the first video, a storage path of the N associated pictures, and the thumbnails of the N associated pictures, and the first target thumbnail is a thumbnail of the first associated picture;
      retrieving the first associated picture based on the storage path of the first associated picture; and
      displaying, based on detecting the second input operation, a picture playback interface adapted for displaying still images, wherein the picture playback interface includes a first picture preview box and the second display box, wherein the first picture preview box is used to display the first associated picture, the first positioning control indicates the first target thumbnail, the first target thumbnail is the thumbnail in the second display box, and the first target thumbnail is the thumbnail of the first associated picture, wherein the second display box is spatially distinct from and does not overlap the first picture preview box in the picture playback interface.

11. The electronic device according to claim 10, wherein after the detecting the first input operation on the first thumbnail and before the obtaining, based on the group ID of the first video, the thumbnails of the N associated pictures associated with the first video, the operations further comprise:
   reading first information in a media file library, wherein the first information comprises a mapping relationship between a storage path of the first video and the group ID of the first video; and
   obtaining the group ID of the first video based on the first information.

12. The electronic device according to claim 10, wherein the obtaining, based on the group ID of the first video, the thumbnails of the N associated pictures associated with the first video comprises:
   reading the second information in the media information library based on the group ID of the first video; and
   obtaining the thumbnails of the N associated pictures associated with the first video when the storage path of the N associated pictures is read.

13. The electronic device according to claim 10, wherein the second display box comprises a second target thumbnail, and after the displaying the picture playback interface, the operations further comprise:
   detecting an input operation on the second target thumbnail; and
   displaying the video playback interface of the first video.

14. The electronic device according to claim 10, wherein a maximum number of the thumbnails of the N associated pictures displayed in the second display box is M, the second display box comprises a first switching control, and after the displaying the video playback interface of the first video, the operations further comprise:
   detecting an input operation on the first switching control when N is greater than M; and
   switching the thumbnails in the second display box, wherein the thumbnail displayed in the second display box before switching is different from the thumbnail displayed in the second display box after switching.

15. A non-transitory computer-readable storage medium storing instructions that, when executed by a processor, cause an electronic device to perform operations comprising:
  starting a gallery application;
  displaying a first interface of the gallery application, wherein the first interface comprises a first thumbnail, and the first thumbnail is a thumbnail corresponding to a first video;
  detecting a first input operation on the first thumbnail;
  obtaining, based on a group identifier (ID) of the first video, thumbnails of N associated pictures associated with the first video, wherein the N associated pictures are concurrently captured pictures from the first video in a recording process of the first video, the group ID is used to identify the first video, and N is an integer greater than 1;
  displaying, based on detecting the first input operation, a video playback interface adapted for displaying video images, wherein the video playback interface includes a first display box and a second display box, wherein the first display box is used to display an image of the first video, and the second display box is used to display the thumbnails of the N associated pictures, wherein the second display box is spatially distinct from and does not overlap the first display box in the video playback interface;
  detecting a second input operation on a first positioning control, wherein the first positioning control indicates a first target thumbnail, and the first target thumbnail of the N associated pictures displayed is a thumbnail in the second display box;
  obtaining a storage path of a first associated picture from second information based on the first target thumbnail, wherein the second information is information in a media information library, the second information comprises a mapping relationship among the group ID of the first video, a storage path of the N associated pictures, and the thumbnails of the N associated pictures, and the first target thumbnail is a thumbnail of the first associated picture;
  retrieving the first associated picture based on the storage path of the first associated picture; and
  displaying, based on detecting the second input operation, a picture playback interface adapted for displaying still images, wherein the picture playback interface includes a first picture preview box and the second display box, wherein the first picture preview box is used to display the first associated picture, the first positioning control indicates the first target thumbnail, the first target thumbnail is the thumbnail in the second display box, and the first target thumbnail is the thumbnail of the first associated picture, wherein the second display box is spatially distinct from and does not overlap the first picture preview box in the picture playback interface.

16. The computer-readable storage medium according to claim 15, wherein after the detecting the first input operation on the first thumbnail and before the obtaining, based on the group ID of the first video, the thumbnails of the N associated pictures associated with the first video, the operations further comprise:
  reading first information in a media file library, wherein the first information comprises a mapping relationship between a storage path of the first video and the group ID of the first video; and
  obtaining the group ID of the first video based on the first information.

17. The computer-readable storage medium according to claim 15, wherein the obtaining, based on the group ID of the first video, the thumbnails of the N associated pictures associated with the first video comprises:
  reading the second information in the media information library based on the group ID of the first video; and
  obtaining the thumbnails of the N associated pictures associated with the first video when the storage path of the N associated pictures is read.

18. The computer-readable storage medium according to claim 15, wherein the video playback interface further comprises a first control, the first control is a control displayed when a configuration file exists, the first control is configured to trigger generation of a second video, and the second video is different from the first video.

19. The computer-readable storage medium according to claim 18, wherein after the displaying the video playback interface of the first video, the operations further comprise:
  detecting a third input operation on the first control;
  reading third information based on the group ID of the first video, wherein the third information comprises a mapping relationship between a storage path of a configuration file of the first video and the group ID;
  retrieving the configuration file of the first video based on the storage path of the configuration file of the first video;
  processing the first video based on the configuration file of the first video to obtain the second video; and
  displaying a second video playback interface, wherein the second video playback interface is different from the video playback interface, and the first display box in the second video playback interface is used to display an image of the second video.

20. The computer-readable storage medium according to claim 15, wherein the second display box comprises a second target thumbnail, and after the displaying the picture playback interface, the operations further comprise:
  detecting an input operation on the second target thumbnail; and
  displaying the video playback interface of the first video.

* * * * *